United States Patent [19]

Beauregard et al.

[11] Patent Number: 4,962,468

[45] Date of Patent: Oct. 9, 1990

[54] SYSTEM AND METHOD FOR UTILIZING FAST POLYGON FILL ROUTINES IN A GRAPHICS DISPLAY SYSTEM

[75] Inventors: Gary M. Beauregard; Larry K. Loucks; Khoa D. Nguyen; Robert J. Urquhart, all of Austin, Tex.

[73] Assignee: International Business Machines Corporation, Armonk, N.Y.

[21] Appl. No.: 130,851

[22] Filed: Dec. 9, 1987

[51] Int. Cl.$^5$ ............................................. G09G 1/16
[52] U.S. Cl. .................................. 364/521; 340/723; 340/747
[58] Field of Search ............................. 364/518–522; 340/723, 747, 750; 382/44–48

[56] References Cited

U.S. PATENT DOCUMENTS

| | | | |
|---|---|---|---|
| 4,481,594 | 11/1984 | Staggs et al. | 364/521 |
| 4,646,262 | 2/1987 | Smith | 364/900 |
| 4,667,306 | 5/1987 | Smith | 364/900 |
| 4,677,573 | 6/1987 | Brown et al. | 364/521 |
| 4,725,831 | 2/1988 | Coleman | 340/747 |
| 4,730,261 | 3/1988 | Smith | 364/521 |
| 4,758,965 | 7/1988 | Liang et al. | 364/518 |

OTHER PUBLICATIONS

Liang, B. C. C., Method to Determine the Convexity of Polygons, IBM TDB, vol. 28, No. 5, Oct. 1985, pp. 2203–2208.
J. Simmons & J. Gonzalez, Polygon Filling in Graphics Display System, IBM TDB, vol. 24, No. 1A, Jun. 1981, pp. 235–236.
S. Boinodiris, Flag-Mapped Area Fill Algorithm, IBM TDB, vol. 29, No. 4, Sep. 1986, pp. 1441–1446.
Shinde, Yogesh N., Mudur, S. P., Algorithms for Handling the Fill Area Primitive of GKS, Computer Graphics Forum 5 (1986), pp. 105–117.
Chlamtac, Merav, Harary, Itzchak, The Shift X Parity Watch Algorithm for Raster Scan Displays, IEEE Transactions on Computers, vol. C–34, No. 7, Jul. 1985, pp. 666–673.
Foley, J. D., Van Dam, A., Fundamentals of Interactive Computer Graphics, Addison-Wesley, 1982, pp. 456–460.
W. D. Little & R. Heuft, An Area Shading Graphics Display System, IEEE Transactions on Computers, vol. C–28, No. 7, Jul. 1979, pp. 528–531.
S. A. Dudani, Region Extraction Using Boundary Following, Pattern Recognition and Artificial Intelligence, Academic Press, 1976, pp. 216–232.
B. D. Ackland, The Edge Flag Algorithm–A Fill Method for Raster Scan Displays, IEEE Transactions on Computers, Jan. 1981, pp. 41–47.
J. H. Potts et al., The Decomposition of an Arbitrary Three-Dimensional Planar Polygon into a Set of Convex Polygons, Naval Postgraduate School, Feb. 1987, pp. 1–76.
B. Kelleher, "MIPOLYCON", Digital Equipment Corporation and the Massachusetts Institute of Technology, Copyright 1987, 5 pages.

Primary Examiner—Gary V. Harkcom
Assistant Examiner—H. R. Herndon
Attorney, Agent, or Firm—Marilyn D. Smith

[57] ABSTRACT

Two polygon fill algorithms are presented for filling polygons on a graphics display. The first polygon fill algorithm fills polygons that are strictly convex. The second polygon fill algorithm fills a larger class of polygons than the first polygon fill algorithm which includes polygons being concave in the x direction, and polygons having crossing lines. The first polygon fill algorithm tests the polygon for strict convexity by testing for a consistent turning direction, and by testing for once around in the y direction. The first polygon fill algorithm then stores the maximum and minimum value of the pel selected by the Bresenham algorithm for each scan line of the polygon. The fill line is drawn from the pel having the minimum value to the pel having the maximum value for each scan line of the polygon. The second polygon fill algorithm tests the polygon to ensure that it can be filled with one unique fill line for each scan line of the polygon. The second polygon fill algorithm stores both a minimum value and maximum value for each scan line line of the polygon for each line of the polygon. A fill line is then drawn from the least minimum value to the greatest maximum value for each scan line of the polygon.

28 Claims, 38 Drawing Sheets

```
4049    }
4050
4051    shape=atoi(argv[1]);
4252    iter=atoi(argv[2]);
4053
4054    /* below code will be in GSL init one time */
4055    for (j=0; j<2048; j+=2) { /* init the y elements */
4056        ys[j] = j >> 1;
4057        ys[j+1] = j >> 1;
4058    }
4059
4060    if((shape >=4) && (shape <= 7)) { /* read in the poly */
4061        inlines = atoi(argv[3]);
4062        ymin = 4000;
4063        ymax = 0;
4064
4065        for(i=0; i<inlines; i++) {
4066            inx[i] = atoi(argv[4 + 2 * i]);
4067            iny[i] = atoi(argv[5 + 2 * i]);
4068            if(iny[i] > ymax) ymax = iny[i];
4069            if(iny[i] < ymin) ymin = iny[i];
4070        }
4071        printf("\n ymin = %d ymax = %d\n", ymin, ymax);
4072        /* my own copy of the points so I'll add 2 points for gsff.c */
```

© COPYRIGHT IBM CORP 1987

FIG. 4A

```
      ffpf1
4001  #include <stdio.h>  }—40
4002  #include <math.h>
4003
4004  main(argc, argv)
4005      int argc;
4006      char *argv[];
4007  {
4008      extern void genline();
4009      int xs[2048], xs2[2048], ys[2048];
4010      int inx[400], iny[400], inlines;
4011      int x1, x2, y1, y2;
4012      int ymin, ymax, total;
4013      int i, j, k, rc;
4014      int iter;
4015      int shape;
4016      int buffer[400], size, savrst, grant, retract, m_one, zero;
4017      int white, red, blue, style, lop;
4018
4019  #ifdef GSL
4020      /* initialize the screen for GSL */
4021      white = 15;
4022      red = 3;
4023      blue = 4;
4024      style = -1;
```

```
4025      size = 1024;
4026      zero = 0;
4027      m_one = -1;
4028      savrst = 0;      /* non-zero => new screen */
4029      grant = 0;
4030      retract = 0;
4031
4032      rc = gsinit_(buffer, &size, &savrst, &grant, &retract, &m_one);
4033      printf("init rc = %d\n", rc);
4034  #endif
4035
4036   if(argc <3) { /* one more than no of args */
4037      printf("usage: <shape>, <iterations>, input-poly\n");
4038      printf(" (1) shape: 0 = bypass brez (draw rectangle) \n");
4039      printf("                 1 = parallelogram\n");
4040      printf("                 2 = quadralateral\n");
4041      printf("                 3 = 380 x 19 parallelogram\n");
4042      printf("                 4 = input your own(call genline directly)\n");
4043      printf("                 5 = input your own(call gsff/genline1)\n");
4044      printf("                 6 = input your own(call gsff2/genline2\n");
4045      printf(" (2) no of iterations             \n");
4046      printf(" (3) num: no. of lines(closed poly)(ccw please)  \n");
4047      printf(" (4) -(4+2(num) - pts: x1, y1, x2 .... \n");
4048      exit(-1);
```

FIG. 4B

© COPYRIGHT IBM CORP 1987

FIG. 4C

```
4049    }
4050    shape=atoi(argv[1]);
4051    iter=atoi(argv[2]);
4252
4053    /* below code will be in GSL init one time */
4054    for(j=0; j<2048; j+=2) { /* init the y elements */
4055      ys[j] = j >> 1;
4056      ys[j+1] = j >> 1;
4057    }
4058
4059
4060    if((shape >=4) && (shape <= 7)) { /* read in the poly */
4061      inlines = atoi(argv[3]);
4062      ymin = 4000;
4063      ymax = 0;
4064
4065      for(i = 0; i<inlines; i++) {
4066        inx[i] = atoi(argv[4 + 2 * i]);
4067        iny[i] = atoi(argv[5 + 2 * i]);
4068        if(iny[i] > ymax) ymax = iny[i];
4069        if(iny[i] < ymin) ymin = iny[i];
4070      }
4071      printf("\n ymin = %d ymax = %d\n", ymin, ymax);
4072      /* my own copy of the points so I'll add 2 points for gsff.c */
```

© COPYRIGHT IBM CORP 1987

```
4073            inx[inlines] = inx[0];
4074            iny[inlines] = iny[0];
4075            inx[inlines + 1] = inx[1];
4076            iny[inlines + 1] = iny[1];
4077         }
4078
4079         for (i = 0; i < iter; i++) {
4080
4081            switch(shape) {
4082            case 0: /* bypassing brezinham */
4083            for (j = 2 * 400; j <= 2 * 418; j += 2) {
4084               xs[j] = 400;
4085               xs[j+1] = 418;
4086            }
4087            ymin = 400;
4088            ymax = 418;
4089            break;
4090
4091             case 1:  /* parallelogram */
4092            ymax = 418;
4093            ymin = 400;
4094            genline(&xs[0], 400, 400, 418, 400);
4095            genline(&xs[0], 418, 400, 436, 418);
4096            genline(&xs[0], 436, 418, 418, 418);
4097            genline(&xs[0], 418, 418, 400, 400);
4098            break;
4099
4100             case 2:  /* quadralateral */
4101            ymax = 427;
4102            ymin = 400;
4103            genline(&xs[0], 400, 400, 414, 413);
4104            genline(&xs[0], 414, 413, 400, 427);
4105            genline(&xs[0], 400, 427, 387, 414);
4106            genline(&xs[0], 387, 414, 400, 400);
4107            break;
4108
```

© COPYRIGHT IBM CORP 1987

FIG. 4D

```
4109        case 3:  /* larger parallelogram */
4110        ymax = 480;
4111        ymin = 100;
4112        genline(&xs[0], 100, 100, 118, 100);
4113        genline(&xs[0], 118, 100, 496, 480);
4114        genline(&xs[0], 496, 480, 480, 480);
4115        genline(&xs[0], 480, 480, 100, 100);
4116        break;
4117
4118        case 4:  /* inputted poly */
4119        for(j = 0; j < inlines; j++) {
4120            x1 = inx[j];
4121            y1 = iny[j];
4122            x2 = inx[j+1];
4123            y2 = iny[j+1];
4124            genline(&xs[0], x1, y1, x2, y2);
4125            if(y1 > y2) {
4126                if(y1 > ymax) ymax = y1;
4127                if(y2 < ymax) ymin = y2;
4128            }
4129            else {
4130                if(y2 > ymax) ymax = y2;
4131                if(y1 < ymax) ymin = y1;
4132            }
4133        }
4134        break;
4135
```

© COPYRIGHT IBM CORP 1987

FIG. 4E

```
4136        case 5:  /* inputted poly - call GSL function(gsff) */
4137          gsff(inlines, &inx[0], &iny[0], &xs[0], &ys[0]);
4138          break;
4139
4140        case 6:  /* inputted poly - call GSL function(gsff2) */
4141  50⌐    gsff2(inlines, &inx[0], &iny[0], &xs[0], &xs2[0], &ys[0]);
4142          break;
4143
4144        case 7:  /* inputted poly - call GSL function(gsff) */
4145          i = iter;  /* only one pass */
4146  70⌐    gsff2(inlines, &inx[0], &iny[0], &xs[0], &xs2[0], &ys[0]);
4147          for (j = ymin; j <= ymax; j++) {      /* copy gen2 into xs2 */
4148            xs2[2 * j]   = xs[2 * j];
4149            xs2[2 * j+1] = xs[2 * j+1];
4150          }
4151          gsff(inlines, &inx[0], &iny[0], &xs[0], &ys[0]);
4152          printf("\n ymin = %d ymax = %d\n", ymin, ymax);
4153          for (j = ymin; j <= ymax; j++) {
4154            if((x2 = xs2[2 * j]) != (x1 = xs[2 * j])){
4155              printf(" Min diff: y=%4d  (g1 =%d, g2 =%d)\n", j, x1, x2);
4156            }
4157            if((x2 = xs2[2 * j + 1]) != (x1 = xs[2 * j + 1])){
4158              printf(" Max diff: y=%4d  (g1 =%d, g2 =%d)\n", j, x1, x2);
4159            }
4160          }
```

FIG. 4F

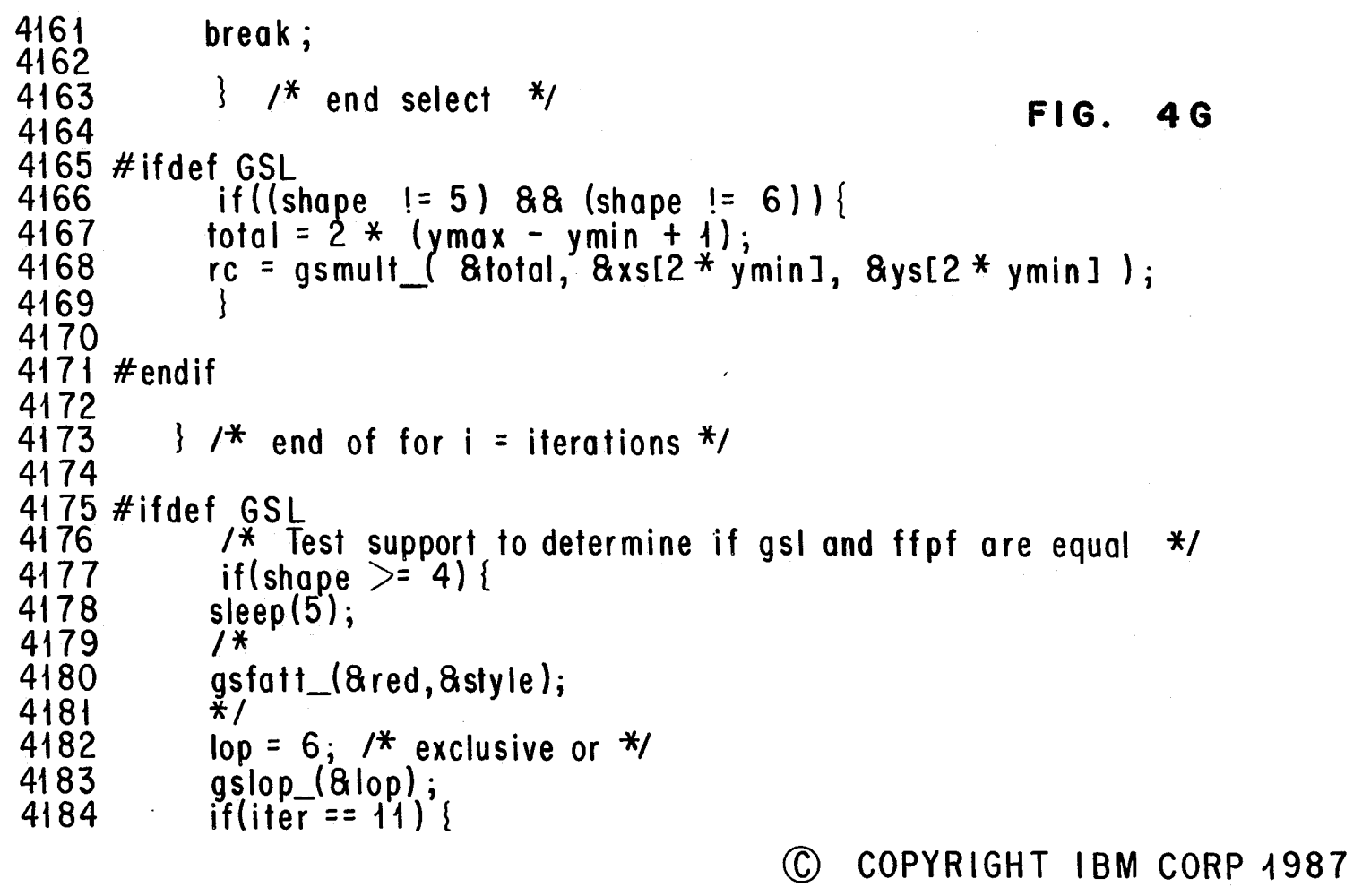

```
4161            break;
4162         }    /* end select */
4163
4164    #ifdef GSL
4165         if((shape != 5) && (shape != 6)){
4166            total = 2 * (ymax - ymin + 1);
4167            rc = gsmult_( &total, &xs[2 * ymin], &ys[2 * ymin] );
4168         }
4169    #endif
4170
4171       }  /* end of for i = iterations */
4172
4173    #ifdef GSL
4174       /* Test support to determine if gsl and ffpf are equal */
4175       if(shape >= 4){
4176          sleep(5);
4177       /*
4178       gsfatt_(&red,&style);
4179       */
4180       lop = 6;   /* exclusive or */
4181       gslop_(&lop);
4182       if(iter == 11){
```

FIG. 4G

```
4185        for(j = 0; j < inlines; j++) {
4186          inx[j] += 5;
4187          iny[j] += 5;
4188        }
4189        gsfply_(&inlines,inx,iny);
4190        scanf("%d", &ii);
4191      }
4192      gsterm_();
4193      printf(" multi line rc %d \n",rc);
4194  #endif
4195      if(iter == 1) {
4196        printf("\n ymin = %d ymax = %d\n", ymin, ymax);
4197        for (i= ymin; i <= ymax; i++) {
4198          printf(" y = %d (%d - %d)\n", i, xs[2*i], xs[2*i + 1]);
4199        }
4200        printf("\n");
4201      }
```

FIG. 4H

```
5047        50     151    152   153  154  155
5048   gsff(inlines, inx, iny, xs, ys)
5049        int inlines;
5050        int inx[ ];
5051        int iny[ ];                            FIG. 5A
5052        int xs[ ], ys[ ];
5053   {
5054        extern void genline( );
5055        extern void gsmult_( );
5056        extern void gsline_( );
5057        int x0, x1, x2, y0, y1, y2;
5058        int x, y, ymin, ymax, total;
5059        int * inxp;
5060        int * inyp;
5061        int i, j, k;
5062        int dx1m0, dx2m1, dy1m0, dy2m1;
5063        int dir, dir1, fail;
5064        int ylow, yhigh;
5065        /* around check */
5066        int cnt;  /* no of dy sign changes */
5067        int oldsign, newsign; /* sign of dy. 1 = plus */
5068
5069        fail = 0;
5070                                             57
5071        /* initial the turning test */
5072        inxp = inx;
5073        inyp = iny;
5074        dx1m0 = (x1 = *(inxp + 1)) - *(inxp);
5075        dx2m1 = *(inxp + 2) - x1;
5076        dy1m0 = (y1 = *(inyp + 1)) - *(inyp);
5077        dy2m1 = *(inyp + 2) - y1;
5078        dir = dy1m0 * dx2m1 > dx1m0 * dy2m1; /* cw */
5079                                              58
5080        /* initialize the once-around test */
5081        cnt = 1;
5082        oldsign = dy1m0 > 0; /* 1 = plus */
5083
5084        /* initialize ymin, ymax */
5085        ylow = 0 ;
```

© COPYRIGHT IBM CORP 1987

FIG. 5B

```
5086        yhigh = 0;
5087        ymin = ymax = *(inyp);
5088
5089        for(i = 1; i < inlines; i++) {
5090           /* turning test */
5091           inxp += 1; /* &inx[i] */
5092           inyp += 1; /* &iny[i] */
5093           dx1m0 = dx2m1;
5094           dy1m0 = dy2m1;
5095           dx2m1 = *(inxp+2) - *(inxp+1);
5096           dy2m1 = *(inyp+2) - *(inyp+1);
5097           dir1 = dy1m0 * dx2m1 > dx1m0 * dy2m1, /*>=>cw */
5098
5099           /* once-around test */
5100           newsign = dy1m0 > 0; /* 1 = plus */
5101           cnt += newsign != oldsign;
5102           oldsign = newsign;
5103
5104           if((dir != dir1) || (cnt >= 4)) {
5105           fail = 1;
5106           break; /* get out of for loop asap */
5107           }
5108
5109           y = *inyp;
5110           if(y > ymax) { ymax = y; yhigh = i; }
5111           else if(y < ymin) { ymin = y; ylow = i; }
5112        }
5113
5114        total = 2 * (ymax - ymin + 1);
5115
5116 #ifdef DB
5117        printf(" ymax = %d, ymin = %d\n", ymax, ymin);
5118 #endif
5119        if(fail == 1) {
5120           if(dir != dir1)
5121           printf("Convexity test failed\n");
5122           if(cnt >= 4)
5123           printf("Around test failed\n");
```

© COPYRIGHT IBM CORP 1987

FIG. 5C

```
5124          return;
5125        }
5126  #ifdef DB
5127        else {
5128          printf("Convexity test succeeded\n");
5129          if(dir == 0) {
5130          printf("   Polygon is Counterclockwise\n");
5131        }
5132          else printf("   Polygon is Clockwise\n");
5133        }
5134  #endif
5135
5136        /* initialize &xs @ index of ymin & ymax */
5137        xs[2 * *(iny + ylow) + 1] = *(inx + ylow); /* init max @ ymin */
5138        xs[2 * *(iny + yhigh)] = *(inx + ylow);   /* init min @ ymax */
5139
5140        if(dir == 0) { /* ccw from index = ylow */
5141          for(i = 0; i < inlines; i++)
5142          if((j = i + ylow) >= inlines) j -= inlines;
5143  #ifndef NOGEN
5144          genline(&xs[0], *(inx+j), *(iny+j), *(inx+j+1), *(iny+j+1));
5145  #endif
5146        }
5147      }
```

60

```
5148      else {
5149        for(i = 0; i < inlines; i++) {
5150          if((j = ylow - i) <= 0) j += inlines;
5151 #ifndef NOGEN
5152          genline(&xs[0], *(inx+j), *(iny+j), *(inx+j-1), *(iny+j-1));
5153                                    ~152        ~153         ~156       ~157
5154 #endif
5155        }
5156      }
5157 #ifdef DB
5158      for(i = ymin; i <= ymax; i++) {
5159        printf(" y = %d, (%d -- %d)\n", i, xs[2*i], xs[2*i+1]);
5160      }
5161 #endif
5162
5163 #ifdef GSL
5164      gsmult_(&total, &xs[2 * ymin], &ys[2 * ymin]);
5165 #endif
5166    }
5167
5168
```

FIG. 5D

© COPYRIGHT IBM CORP 1987

```
6038  genline(xs, x1, y1, x2, y2)
6039    int xs[];
6040    int x1, y1, x2, y2;
6041  {
6042    int dx, dy;
6043    int a, b, i;
6044    int b2, bma;
6045    int oct;
6046    int y, x;
6047    int * tab;
6048
6049    dx = x2 - x1;
6050    dy = y2 - y1;
6051
6052    x = x1;
6053    y = y1;
6054
6055    tab = &xs[2 * y];  /* pointing at min table */
6056
6057    /* This logic 1) sets brezinham a & b values & 2) detects octant
6058    */
6059
6060    if(y1 == y2) {           /* horizontal line */
6061      if(x2 > x1)
6062        *(tab + 1) = x2;
```

FIG. 6A

© COPYRIGHT IBM CORP 1987

```
6063          }
6064      else {
6065      *(tab) = x2;
6066          }
6067      return;
6068  }
6069
6070  if(y2 > y1) {      /* 1 2 3 4 */
6071      tab += 1;  /* point @ max table */
6072      if(x2 >= x1) {   /* 1 2 */
6073      if(dx >= dy) {
6074          oct = 1;
6075          a = dx;
6076          b = dy;
6077      }
6078      else {
6079          oct = 2;
6080          a = dy;
6081          b = dx;
6082      }
6083      }
6084      else {         /* 3 4 */
6085      if( -dx >= dy){
6086          oct = 4;
6087          a = -dx;
6088          b = dy;
6089      }
6090      else {
6091          oct = 3;
6092          a = dy;
6093          b = -dx;
6094      }
6095      }
6096  }
6097  else {             /* 5 6 7 8 */
6098      if(x2 >= x1){   /* 7 8 */
6099      if(dx >= -dy){
6100          oct = 8;
```

FIG. 6B

© COPYRIGHT IBM CORP 1987

```
6101            a = dx;
6102            b = -dy;
6103         }
6104        else {
6105           oct = 7 ;
6106           a = -dy;
6107           b = dx;
6108        }
6109     }
6110      else {              /* 5  6 */
6111     if( -dx >= -dy) {
6112        oct = 5 ;
6113        a = -dx;
6114        b = -dy;
6115     }
6116     else {
6117        oct = 6;
6118        a = -dy;
6119        b = -dx;
6120     }
6121       }
6122    }
6123           ⌐170
6124      bma = 2 * (b - a);
6125  171⌐b2 = 2 * b;
```

© COPYRIGHT IBM CORP 1987

FIG. 6C

```
6126      i = (2 * b - a) - (x2 < x1);  /* initial error term */
6127  172
6128    switch(oct) {
6129    case 1:  /* always a max-line(ccw) */
6130      for(x = x1 + 1; x <= x2; x++) {
6131        if(i < 0) {
6132          i = i + b2;
6133        }
6134        else {
6135          i = i + bma;
6136          *tab = x - 1; /* last on previous */
6137          tab += 2;
6138        }
6139      }
6140      *tab = x - 1; /* because x is x2 + 1 after for loop. */
6141      break;
6142
6143    case 2:  /* always a max-line(ccw) */
6144      for(y = y1 + 1; y <= y2; y++) {
6145        if(i < 0) {
6146          i = i + b2;
6147        }
6148        else {
6149          i = i + bma;
6150          x++;
```

FIG. 6D

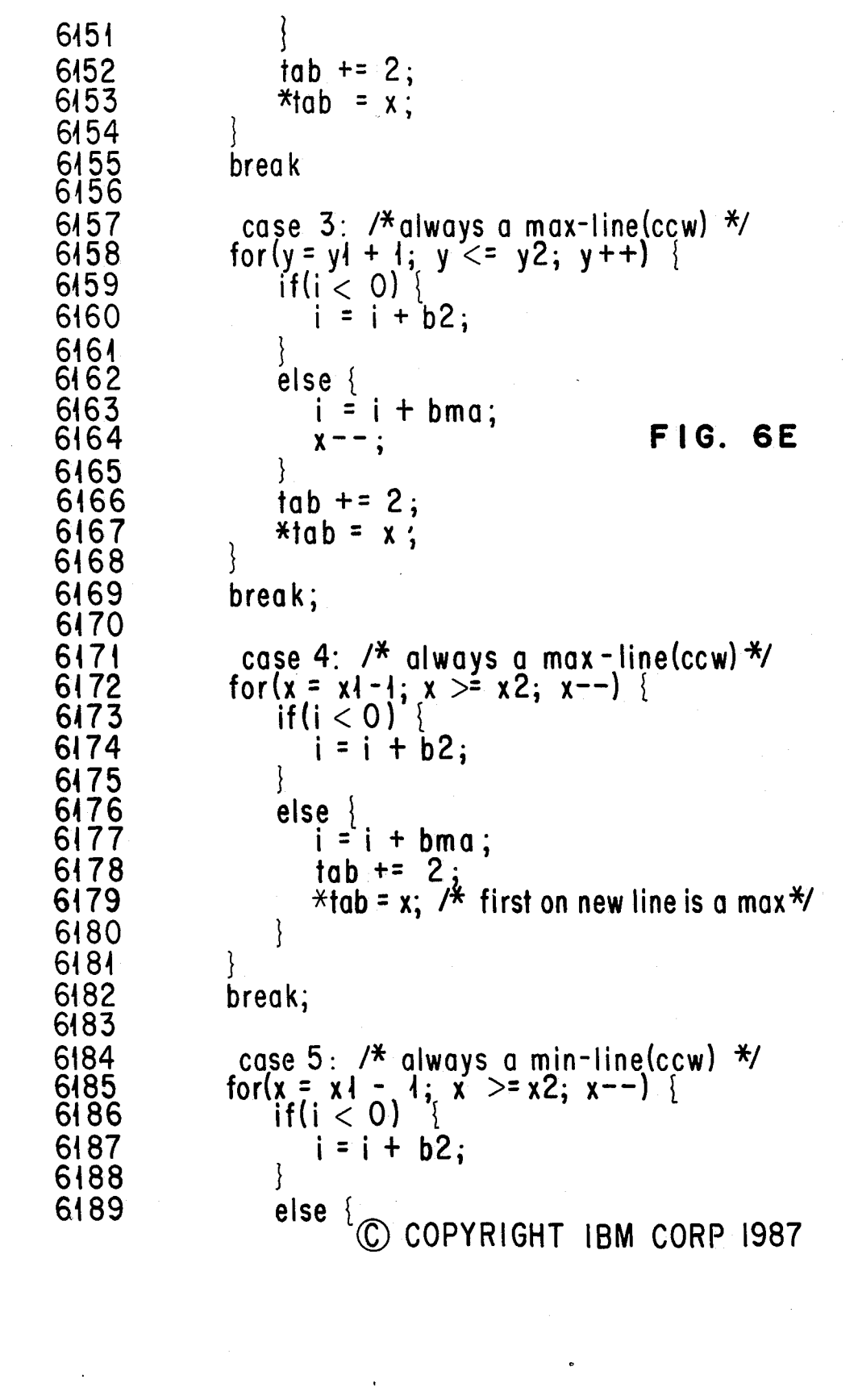

```
6151            }
6152            tab += 2;
6153            *tab = x;
6154          }
6155          break
6156
6157       case 3: /*always a max-line(ccw) */
6158          for(y = y1 + 1; y <= y2; y++) {
6159            if(i < 0) {
6160                i = i + b2;
6161            }
6162            else {
6163                i = i + bma;
6164                x--;
6165            }
6166            tab += 2;
6167            *tab = x;
6168          }
6169          break;
6170
6171       case 4: /* always a max-line(ccw) */
6172          for(x = x1-1; x >= x2; x--) {
6173            if(i < 0) {
6174                i = i + b2;
6175            }
6176            else {
6177                i = i + bma;
6178                tab += 2;
6179                *tab = x; /* first on new line is a max*/
6180            }
6181          }
6182          break;
6183
6184       case 5: /* always a min-line(ccw) */
6185          for(x = x1 - 1; x >= x2; x--) {
6186            if(i < 0) {
6187                i = i + b2;
6188            }
6189            else {
```

FIG. 6E

© COPYRIGHT IBM CORP 1987

```
            i = i + bma;
            *tab = x + 1;  /* last on a scan-line */
            tab -= 2;
        }
    }

*tab = x + 1;  /* tenative last */
    break;

case 6:  /* always a min-line(ccw) */
    for(y = y - 1; y >= y2; y--) {
        if(i < 0) {
            i = i + b2;
        }
        else {
            i = i + bma;
            x--;
        }
        tab -= 2;
        *tab = x;
    }
    break;

case 7:  /* always a max-line(ccw) */
    for(y = y - 1; y >= y2; y--) {
        if(i < 0) {
            i = i + b2;
        }
        else {
            i = i + bma;
            x++;
        }
        tab -= 2;
        *tab = x;
    }
    break;

case 8:  /* always a min-line(ccw) */
    for(x = x + 1; x <= x2; x++) {
        if(i < 0) {
```

FIG. 6F

© COPYRIGHT IBM CORP 1987

```
6229            i = i + b2;
6230          }
6231        else {
6232            i = i + bma;
6233            tab -= 2;
6234            *tab = x; /* first on scan-line is a min */
6235          }
6236        }
6237      break;
6238
6239        default:
6240        break;
6241      } /* end of select */
6242 } /* end of genline */
```

FIG. 6G

© COPYRIGHT IBM CORP 1987

```
7036        /-70
7037 gsff2(inlines, inx, iny, xs, xs2, ys)
7038      int inlines;
7039      int inx[];
7040      int iny[];
7041      int xs[], xs2[], ys[];
7042 {
7043      extern void genline2( );
7044      extern void gsmult_( );
7045      int * tab;
7046      int y0, y1;
7047      int x, y, ymin, ymax, total;
7048      int i, j, k;
7049      int ylow, yhigh;
7050      /* around check */
7051      int cnt; /* no of dy sign changes */
7052      int oldsign, newsign; /* sign of dy. 1 = plus */
7053
7054      fail = 0;
7055
7056      /* init y - convexity test */
```

FIG. 7A

© COPYRIGHT IBM CORP 1987

FIG. 7B

```
7057    cnt = 1;
7058    oldsign = iny[0] > iny[inlines-1];  /* 1 => ccw */
7059
7060    /* init ymin, ymax */
7061    ylow = 0;
7062    yhigh = 0;
7063    ymax = ymin = iny[0];
7064
7065    for(i =1; i < inlines; i++) {       /* y - convexity check */
7066        newsign = iny[i] > iny[i-1];    /* 1 => ccw */
7067        if(newsign != oldsign) cnt += 1;
7068        oldsign = newsign;
7069        if(cnt >= 4) {
7070            break; /* get out of for loop asap */
7071        }
7072
7073        if(iny[i] > ymax) { yhigh = i; ymax = iny[i]; }
7074        if(iny[i] < ymin) { ylow  = i; ymin = iny[i]; }
7075    }
7076
7077    total = 2 * (ymax - ymin + 1);
7078
7079 #ifdef DB
7080    printf(" yhigh = %d,  ylow = %d,  yhigh = %d\n", yhigh, ylow);
```

© COPYRIGHT IBM CORP 1987

```
7081            printf("    ymax = %d, ymin = %d\n", ymax, ymin);
7082    #endif
7083        if(cnt >= 4)
7084            printf("Around test failed\n");
7085            return(-1);
7086        }
7087
7088        /* init 8xs & 8xs2 @ index of ymin & ymax    */
7089        xs[2 * ymin]       = inx[ylow];    /* init xs1 min  */
7090        xs[2 * ymin + 1]   = inx[ylow];    /* init xs1 max  */
7091        xs2[2 * ymax]      = inx[yhigh];   /* init xs2 min  */
7092        xs2[2 * ymax + 1]  = inx[yhigh];   /* init xs2 max  */
7093
7094        tab = xs;
7095        for(i = 0; i < inlines; i++) {
7096            if((j = i + ylow) >= inlines) j -= inlines;
7097            if(j == yhigh) tab = xs2;
7098    #ifndef NOGEN
7099            genline2(tab, inx[j], iny[j], inx[j+1], iny[j+1]);
7100    #endif
7101        }
7102
7103    #ifndef NOGEN
7104        /* combine 2 tables into 1  */
7105        for(i = 2 * ymin; i <= 2 * ymax; i += 2) {
```

FIG. 7C

© COPYRIGHT IBM CORP 1987

```
7106            if(xs2[i] < xs[i])       xs[i] = xs2[i];         /* min */
7107            if(xs2[i+1] > xs[i+1])   xs[i+1] = xs2[i+1];     /* max */
7108         }
7109  #endif
7110
7111  #ifdef GSL
7112         gsmult_(&total, &xs[2 * ymin], 8ys[2 * ymin]);
7113  #endif
7114
7115         return(0);
7116      }
7117
7118
```

FIG. 7D       © COPYRIGHT IBM CORP 1987

```
8045 genline2(xs, x1, y1, x2, y2)
8046      int xs[];
8047      int x1, y1, x2, y2;
8048   {
8049      int dx, dy;
8050      int a, b, i;
8051      int b2, bma;
8052      int oct;
8053      int y, x;
```

FIG. 8A       © COPYRIGHT IBM CORP 1987

```
8054        int * tab;
8055        int yy;
8056
8057        #ifdef DB
8058          printf(" \n ****** @input of genline: \n");
8059          printf("          (%3d, %3d) ==> (%3d, %3d)\n", x1, y1, x2, y2);
8060        #endif
8061
8062        dx = x2 - x1;
8063        dy = y2 - y1;
8064
8065        x = x1;
8066        y = y1;
8067        tab = &xs[2 * y];           /* set tab to initial y */
8068
8069        /*
8070        /  This logic 1) sets brezinham a & b values, and 2) detects octant.
8071        */
8072        if(y1 == y2){               /* horizontal line */
8073          if(x2 > x1) {             /* 1 */
8074            *(tab + 1) = x2;        /* save max x */
8075          } else {                  /* 4 */
8076            *tab = x2;              /* save min x */
8077          }
8078          return;
```

FIG. 8B

© COPYRIGHT IBM CORP 1987

```
8079         }
8080         if(y2 > y1) {                /* 1 2 3 4 */
8081             if(x2 >= x1) {           /* 1 2 */
8082                 if(dx >= dy) {
8083                     oct = 1;
8084                     a = dx;
8085                     b = dy;
8086                 } else {
8087                     oct = 2;
8088                     a = dy;
8089                     b = dx;
8090                 }
8091             } else {                  /* 3 4 */
8092                 if( -dx >= dy) {
8093                     oct = 4;
8094                     a = -dx;
8095                     b = dy;
8096                 } else {
8097                     oct = 3;
8098                     a = dy;
8099                     b = -dx;
8100                 }
8101             }
8102         } else {                      /* 5 6 7 8 */
8103             if(x2 >= x1){             /* 7 8 */
8104                 if(dx >= -dy){
8105                     oct = 8;
8106                     a = dx;
8107                     b = -dy;
8108                 } else {
8109                     oct = 7;
8110                     a = -dy;
8111                     b = dx;
8112                 }
8113             } else {                  /* 5 6 */
8114                 if( -dx >= -dy) {
8115                     oct = 5;
8116                     a = -dx;
8117                     b = -dy;
```

FIG. 8C

© COPYRIGHT IBM CORP 1987

FIG. 8D

```
8118        } else {
8119          oct = 6;
8120          a = -dy;
8121          b = -dx;
8122        }
8123      }
8124
8125
8126      bma = 2 * (b - a);
8127      b2 = 2 * b;
8128      i = (2 * b - a) - (x2 < x1) ;  /* initial error term */
8129
8130  #ifdef DB
8131      printf("@final oct switch: oct = %d\n", oct);
8132      printf("(%3d, %3d) ==> (%3d, %3d)\n", x1, y1, x2, y2);
8133      printf("x = %3d, y = %3d\n", x, y);
8134
8135  #endif
8136
8137      switch(oct) {
8138        case 1: /* always a max-line(ccw) */
8139          for(x = x + 1; x <= x2; x++) {
8140            if(i < 0) {
8141              i = i + b2;
8142            } else {
```

© COPYRIGHT IBM CORP 1987

FIG. 8E

```
8143            i = i + bma;
8144            *(tab + 1) = x - 1;   /* save max x ( x was inc'd) */
8145            tab += 2;              /* step to new y */
8146            *tab = x;              /* save new y's min x */
8147          }
8148        }
8149        *(tab + 1) = x - 1;        /* save max x    */
8150        break;
8151
8152   case 2:  /* always a max-line(ccw) */
8153        for(y = y + 1; y <= y2; y++) {
8154            if(i < 0) {
8155                i = i + b2;
8156            } else {
8157                i = i + bma;
8158                x++;
8159            }
8160            tab += 2;               /* step to new y */
8161            *tab = x;               /* save min x */
8162            *(tab + 1) = x;         /* save max x */
8163        }
8164   #ifdef DB
8165        printf("In oct = %d\n", oct);
8166        printf("  x = %3d, y = %3d\n", x, y);
8167   #endif
8168
```

© COPYRIGHT IBM CORP 1987

```
8169            }
8170            break;
8171
8172            case 3:  /* always a max-line(ccw) */
8173            for(y = y + 1; y <= y2; y++) {
8174                if(i < 0) {
8175                    i = i + b2;
8176                } else {
8177                    i = i + bma;
8178                    x--;
8179                }
8180                tab += 2;        /*step to new y */
8181                *tab = x;        /*save min x */
8182                *(tab+1)= x;     /*save max x */
8183
8184 #ifdef DB
8185     printf("       In oct = %d\n", oct);
8186     printf("       x = %3d, y = %3d\n", x, y);
8187 #endif
8188
8189            }
8190            break;
8191
8192            case 4:  /* always a max-line(ccw) */
8193            for(x = x - 1; x >= x2; x--) {
8194                if(i < 0) {
8195                    i = i + b2;
8196                } else {
8197                    i = i + bma;
8198                    *tab = x + 1;  /* save min x */
8199                    tab += 2;      /* step to a new y */
```

© COPYRIGHT IBM CORP 1987

```
8200            *(tab + 1) = x;                     /* save max x (drawing toward min x) */
8201          }
8202      *tab = x + 1;                             /* save last min x */
8203      break;
8204
8205    case 5:   /* always a min-line(ccw) */
8206      for(x = x - 1; x >= x2; x--) {
8207        if(i < 0) {
8208          i = i + b2;
8209        } else {
8210          i = i + bma;
8211          *tab = x + 1;
8212          tab -= 2;                              /* save min x (x was dec'd) on this y */
8213                                                 /* step y */
8214          *(tab + 1) = x;                        /* save max x (drawing toward min x) */
8215        }
8216      *tab = x + 1;                              /* save last min x */
8217      break;
8218
8219    case 6:   /* always a min-line(ccw) */
8220      for(y = y - 1; y >= y2; y--) {
8221        if(i < 0) {
8222          i = i + b2;
```

FIG. 8G

© COPYRIGHT IBM CORP 1987

```
8225            } else {
8226               i = i + bma;
8227               x--;
8228            }
8229            tab -= 2;       /* step y */
8230            *tab = x;       /* save min x */
8231            *(tab +1) = x;  /* save max x*/
8232
8233 #ifdef DB
8234      printf("      In oct = %d\n", oct);
8235      printf("         x = %3d, y = %3d\n", x,y);
8236 #endif
8237
8238         }
8239         break;
8240
8241      case 7:  /* always a min-line(ccw) */
8242         for(y = y - 1; y >= y2; y--) {
8243            if(i < 0) {
8244               i = i + b2;
8245            } else {
8246               i = i + bma;
8247               x++;
8248            }
8249            tab -= 2;       /* step y  */
8250            *tab = x;       /* save min x */
8251            *(tab +1) = x;  /* save max x */
8252
8253 #ifdef DB
8254      printf("      In oct = %d\n", oct);
8255      printf("         x = %3d, y = %3d\n", x,y);
8256 #endif
8257
8258         }
8259         break;
8260
8261      case 8:  /* always a min-line(ccw) */
8262         for(x = x + 1; x <= x2; x++) {
8263            if(i < 0) {
```

FIG. 8H

© COPYRIGHT IBM CORP 1987

```
8264            i = i + b2;
8265          } else {
8266            i = i + bma;
8267            *(tab + 1) = x - 1;  /* save max x */
8268            tab -= 2;            /* step y */
8269            *tab = x;            /* save min x for this y */
8270          }
8271        }
8272        *(tab + 1) = x - 1;      /* save last max x */
8273        break;
8274
8275      default:
8276        break;
8277
8278    } /* end of case */
8279
8280  } /* end of genline */
```

FIG. 8 I

© COPYRIGHT IBM CORP 1987

| Ported Applications / New Applications | | | |
|---|---|---|---|
| Application Development Facilities | Extended Operating System Functions | PC Compatibility | |
| Base Operating System | | | |
| VRM | | | |
| Processor and Memory Management Unit | | PC AT Coprocessor | |
| I/O Channel and Devices | | | |

| Applications |
|---|
| Application Development Products |
| AIX Kernal |
| VRM |

| | 101 | 110 | | 100 |
|---|---|---|---|---|
| 105 — | y0 | | xmin | — 106 |
| | y0 | | xmax | — 107 |
| | y1 | | xmin | |
| 103 — | y1 | | xmax | |
| | y2 | | xmin | |
| | y2 | | xmax | |
| | y3 | | xmin | |
| | y3 | | xmax | |
| | y4 | | xmin | |
| 103 — | y4 | | xmax | |
| | ⋮ | ⋮ | | |
| 108 — ymin | y10 | 257 | xmin | — 106 |
| 109 — ymin | y10 | 257 | xmax | — 107 |
| | y11 | 257 | xmin | |
| | y11 | 259 | xmax | |
| | y12 | 256 | xmin | |
| | y12 | 261 | xmax | |
| | y13 | 256 | xmin | |
| | y13 | 263 | xmax | |
| | ⋮ | ⋮ | | |
| ymax | y31 | 259 | xmin | — 106 |
| ymax | y31 | 259 | xmax | — 107 |
| | ⋮ | ⋮ | | |
| | y47 | | xmin | — 106 |
| | y47 | | xmax | — 107 |
| | ⋮ | ⋮ | | |
| 107 — | y(screen size −1) | | xmin | |
| | y(screen size −1) | | xmax | |

FIG. 10

TABLE A -111

| | min | max |
|---|---|---|
| y0 | | |
| y1 | | |
| y2 | | |
| ⋮ | | |
| y10 | 257 | 257 |
| y11 | 257 | 257 |
| y12 | 256 | 257 |
| y13 | 256 | 256 |
| ⋮ | | |
| y47 | | |
| screen size -1 | | |

TABLE B -112

| | min | max |
|---|---|---|
| y0 | | |
| y1 | | |
| y2 | | |
| ⋮ | | |
| y10 | 257 | 257 |
| y11 | 258 | 259 |
| y12 | 260 | 261 |
| y13 | 262 | 263 |
| ⋮ | | |
| y47 | | |
| screen size -1 | | |

FIG. 11

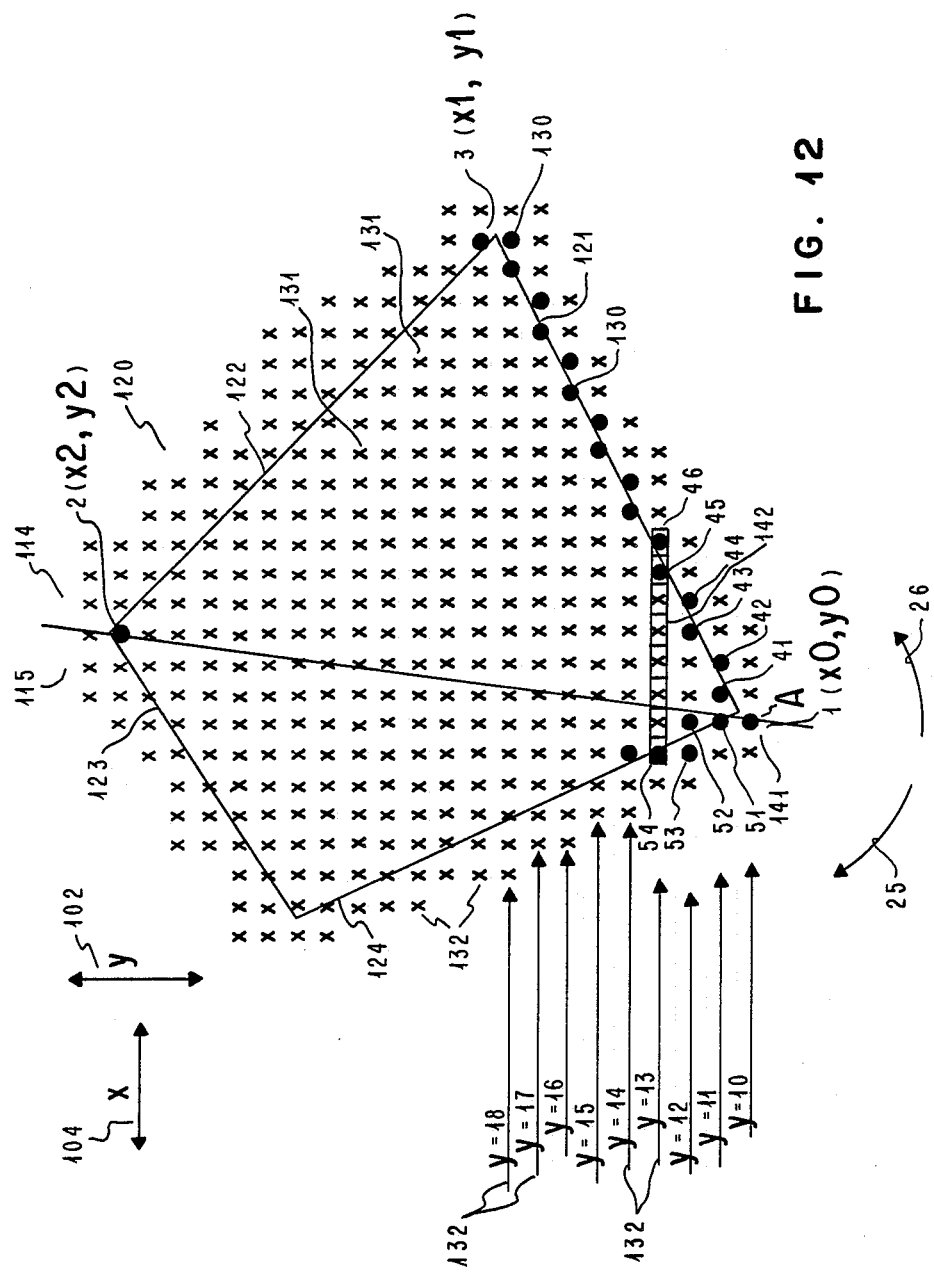

SYSTEM AND METHOD FOR UTILIZING FAST POLYGON FILL ROUTINES IN A GRAPHICS DISPLAY SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to graphical raster displays, and more particularly to a system and method for filling in the area defined by the boundaries of a polygon that is being displayed on a graphical raster display system.

BACKGROUND ART

There is a general algorithm for filling polygons as described in J. D. Foley and A. Van Dam, *Fundamentals of Interactive Computer Graphics* (Addison-Wesley, 1982), pages 456-460. This general algorithm is referred to as an edge table driven algorithm. This type of algorithm is used in computer graphic applications as one of the standard routines that are called to perform certain graphic tasks. Some of these graphic tasks include drawing lines, circles, arcs, etc., including filling polygons. These tasks are typically supplied in a library containing graphical functions such as a Graphics Support Library (GSL). In general, a graphics support library is a package of graphic subroutines that are typically delivered with a processing system so that users can write to displays with a higher level interface without having to know the complexity of any particular display and how to write to that display.

For some simpler shapes of polygons, this algorithm becomes too time consuming. An algorithm becomes unduly time consuming when users of graphical applications have to wait after they have selected the polygon fill routine from a graphics library before the display screen displays the resulting filled polygon. It is important for customer satisfaction that the fill rate be as fast as possible without trading off the accuracy of the filled polygon.

In another known algorithm, the algorithm routine uses the Bresenham algorithm defined in J. E. Bresenham, "Algorithm for Computer Control of a Digital Plotter", IBM Systems Journal, Vol. 4, No. *1* (1965), pages 25-30. The Bresenham algorithm is also described in J. D. Foley and A. Van Dam, *Fundamentals of Interactive Computer Graphics* (Addison-Wesley), 1982), pages 433-436. The Bresenham algorithm is used to scan the lines of the polygon boundary, and to generate the points that make up the polygon boundary. However, this known polygon fill algorithm selects the first point after a change in the scan line. The problem with this algorithm is that it does not accurately fill within the boundaries of the polygon. The resulting displayed polygon will appear as if it is incompletely filled. That is, the fill does not reach the boundary of the polygon at all locations.

There are a variety of different shapes of polygons. Depending on the shape of a particular polygon, there may exist a polygon fill routine that is more efficient for that particular polygon shape than for other polygons having a different shape. The article "Method To Determine The Convexity of Polygons", IBM Technical Disclosure Bulletin Vol. 28 No. 5 October 1985 pages 2203 to 2208 discloses that for convex polygons, there exist filling algorithms which are more efficient than those for general polygons.

By referring to FIG. 1A, the above mentioned article states that a polygon 10 is convex if all of its interior angles at the vertices A, B, C, D, E, are less than 180 degrees. FIG. 1B illustrates a polygon 11 that is not convex by this definition since it has an interior angle at its vertex E which is greater than 180 degrees.

A method is disclosed in the article that determines whether or not all interior angles are less than 180 degrees, and therefore whether or not the polygon is convex. The method takes the cross product for each two adjoining vectors given by the edges of the polygon. If all of the cross products have the same sign, then the polygon is convex. The cross product indicates whether each side of the polygon is turning in the same direction. As shown in FIG. 1A, proceeding around the polygon 10 in the direction shown by the arrow 12 and starting at vertex E, all turns are to the left. However, in FIG. 1B, proceeding around the polygon 11 in the directions shown by the arrow 13 and starting at vertex D, all turns are to the left, except the turn at vertex E which is to the right.

The above test would thereby classify the polygons 20, 21 shown in FIG. 2A and 2B as being convex since all interior angles are less than 180 degrees. Also, as shown in either FIG. 2A or FIG. 2B, in proceeding around the polygon 20, 21 in the direction shown by the arrow 22, 23 and starting at vertex B, all turns are to the left. However, the polygons 20, 21 shown in FIG. 2A and 2B have crossing lines and turn more than once around. These type of polygons are more complex and are not accurately filled by the simpler and more efficient fill algorithms previously known in the art. Therefore, the method described in the above mentioned article does not correctly determine the convexity of polygons for all types of polygons.

Another problem is that the previous methods of testing polygons classified polygons having shapes as shown in FIG. 3A and 3B together with all other general polygons. The polygons 30, 31 of FIG. 3A and FIG. 3B are known as having x-concavity. Also, the polygon 31 of FIG. 3B has both x-concavity and crossing lines.

SUMMARY OF THE INVENTION

An object of this invention is to accurately fill a polygon by including the points in the Bresenham algorithm that define the boundaries of the polygon in the resulting filled polygon.

A further object of this invention is to accurately determine whether a polygon is convex for any given type of polygon.

A further object of this invention is to utilize a fast fill routine for convex polygons that appears to a user to completely fill the polygon up to and including the boundaries of the polygon.

A further object of this invention is to utilize a second fast fill routine for polygons having x-concavity with no crossing lines, and for polygons having x-concavity with crossing lines.

The system and method of this invention implements one of three polygon fill algorithms for optimizing the processing time required to fill a polygon depending upon the particular shape of the polygon. Several tests are used on the polygon to determine if the polygon falls within the class of polygons to be filled by a particular polygon fill algorithm.

For one class of polygons, strictly convex polygons, the processing time required for filling a polygon is optimized by a first polygon fill algorithm by storing one maximum value for each scan line of the polygon for one half of the polygon, and one minimum value for each scan line of the polygon for the other half of the polygon. This algorithm stores exactly one value since the algorithm knows whether at any particularly point along the polygon, the point is part of the maximum or minimum values.

For another class of polygons, x-concavity polygons, the first polygon fill algorithm is inadequate to accurately fill a polygon within this class of polygons. In this class of polygons, the processing time required to accurately fill a polygon is optimized by storing two minimum and maximum values for each scan line of a polygon. The fill line is then drawn from the least minimum value to the greatest maximum value for each scan line.

The first polygon fill algorithm fills polygons that are strictly convex. The second polygon fill algorithm fills a larger set of polygons than the first polygon fill algorithm. The second polygon fill algorithm fills all polygons which can be filled with exactly one continuous line per scan. Polygons in this set may have x-concavity and crossing lines.

The first polygon fill algorithm checks the polygon to determine if the polygon is strictly convex by checking for the combination of two conditions. First, the polygon is checked for consistent "turning" direction. That is, determining whether each sequential line of the polygon bend in the same direction. As a result of this test, the direction is determined as being clockwise or counter clockwise. For any two adjacent lines with points (x0, y0), (x1,y1), (x2,y2), the calculation for the sign of the vector product is as follows:

$$(y1-y0)*(x2-x1)-(y2-y1)*(x1-x0)$$

If the above expression is greater than zero, then the polygon is turning right, or clockwise. If the above expression is less than zero, then the polygon is turning left, or counter clockwise. If all adjacent lines have the same vector product sign, the polygon meets this first condition as having a consistent "turning" direction.

The second condition that must be met for the polygon to be strictly convex is the once around y direction test. This is equivalent to having the sum of the interior angles equal to 360 degrees.

The "once around " test states that if the starting location is the lowermost vertex, and the polygon is traversed sequentially along its edges, the y coordinates of the sequential edges must first all increase and then decrease. In other words, a first group of edges of the polygon must first all rise, and the second group of edges of the polygon must all then fall.

The once around condition is met if by starting at the first line of the polygon the algebraic sign of $y(i+1)-y(i)$ for all adjacent vertices changes exactly 2 or 3 times. Horizontal lines are considered to have the same sign as the previous line. Polygons passing this test have y-convexity. That is, for any value of y there is one and only one continuous fill line. While traversing around the points of the polygon for the "once around" test, the maximum and minimum y values and locations are stored in memory.

If the consistent turning direction test and the once around test are met, the polygon is strictly convex. The lines of the polygon can be partitioned into two sets such that the lines of one set defines maximum values of scan lines, while the other set defines minimum values.

For a strictly convex polygon, a single table of two values per y value is used. The y value ranges from zero to the largest number of scan lines on the display of interest. Starting at the point of the minimum y value and proceeding in a counter clockwise direction, for each line of the polygon the maximum value of that line for every scan line that it intersects is saved in a table. An exception is made for vertexes having two lines that intersect on the same scan line. Special processing is used to store one maximum value on that scan line of a pel that both lines may share. This is continued for each line of the polygon until the maximum vertex in the y direction (ymax) is reached. From this point on, the lines define only minimum scan lines. For each line of the polygon, the minimum value of that line for every scan line that it intersects is saved in the table. Again, an exception is made for vertexes having two lines that intersect on the same scan line. Special processing is used to store one minimum value on that scan line of a pel that both lines may share. After filling the table by traversing all of the lines of the polygon, the GSL multiline draw routine is called in one preferred embodiment to draw one horizontal line per y in the range ymin to ymax. Other preferred embodiments may use other methods to draw a line from the selected minimum pel to the selected maximum pel for each scan line.

The second polygon fill algorithm fills a larger set of polygons than the first polygon fill algorithm. All polygons can be filled with this second polygon fill algorithm if the polygon can be filled with exactly one continuous line per scan line. Polygons in this set have x-concavity and/or crossing lines.

The only check is for the once around in the y direction condition as described above. Also, the ymin and ymax values and their associated vertices are recorded. In this case, there is no knowledge about whether the direction is clockwise or counter clockwise. In fact, in polygons with crossing lines, the clockwise and counter clockwise distinction is irrelevant.

The lines of the polygon are again divided into two sets, those between ymin and ymax in the order originally presented. Lines of the polygon in either set may define a minimum or maximum on a given scan line. Therefore, two tables are used to store either the minimum or the maximum value, one for each set of lines.

Starting at the point of the minimum y value of the polygon and proceeding through the first set of lines, both the minimum and maximum of a given line at the intersection with a scan line are stored. As the polygon is traversed, the second table likewise stores the minimum and maximum values of a given line at each intersection with a scan line for he second set of lines in the polygon.

The minimum value for a given scan line is the minimum of the two values for that scan line from the two tables. Likewise, the maximum value for a given scan line is the maximum of the two values for that scan line from the two tables. At this point, either the two tables are scanned and combined to one table and the GSL multiline function is called; or pointers to both tables are passed to a new GSL multiline routine that combines them as it calls for each horizontal line to be drawn. Other preferred embodiments may use other methods to draw a line from the selected minimum pel to the selected maximum pel for each scan line.

In the above polygon fill algorithms, there are two stages of the algorithm. The first stage scans all the lines of the polygon. For each line of the polygon, the Bresenham algorithm is utilized on each point along a line of the polygon. The processing time required to fill a polygon is optimized since the determination of whether the value of a point is to be stored in a min/max table is made at the time the Bresenham algorithm operates on that particular point. In this way, the second stage, the post processing is done integrally with the preprocessing, the first stage. Once the first stage, the preprocessing is complete, only a minimal amount of additional processing is needed to fill the polygon.

The second stage, the post process, is virtually nonexistent for the first polygon fill routine. As the Bresenham algorithm operates, a single store is performed in a table having a minimum and maximum value for each y value of each scan line. In the post processing, the polygon is filled by scanning the array from ymin to ymax, and drawing a line from the minimum to the maximum value stored for each y value.

In the post processing of the second polygon fill algorithm, the polygon is filled by first determining the maximum of the maximum values stored, and the minimum of the minimum values stored for each y value. A line is then drawn from the least minimum value to the greatest maximum value for each y scan line.

BRIEF DESCRIPTION OF THE DRAWING

FIG. 4A, 4B, 4C, 4D, 4E, 4F, 4G, 4H represents the code in C language of the main driver program that calls the first polygon fill algorithm and the second polygon fill algorithm.

FIG. 5A, 5B, 5C, 5D represents the code in C language for the front end, gsff, of the first polygon fill algorithm.

FIG. 6A, 6B, 6C, 6D, 6E, 6F, 6G represents the code in C language for the first polygon fill algorithm.

FIG. 7A, 7B, 7C, 7D represents the code in C language for the front end, gsff2, of the second polygon fill routine.

FIG. 8A, 8B, 8C, 8D, 8E, 8F, 8G, 8H, 8I represents the code in C language for the second polygon fill routine, genline2.

FIG. 10 illustrates an array used with the first polygon fill algorithm.

FIG. 11 illustrates the two arrays that are used with the second polygon fill algorithm.

FIG. 12 illustrates a polygon displayed by pels which is filled by the first and second polygon fill algorithm of this invention.

DESCRIPTION OF THE PREFERRED EMBODIMENT

Figure 1A:
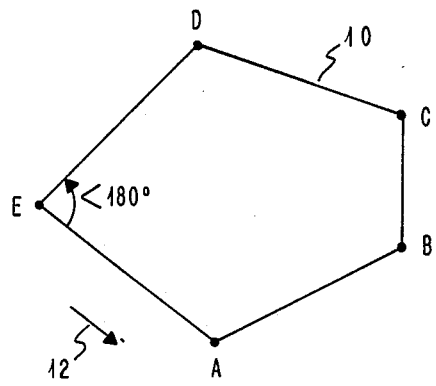
FIG. 1A illustrates a polygon that is convex as defined by prior art methods.
Figure 1B:
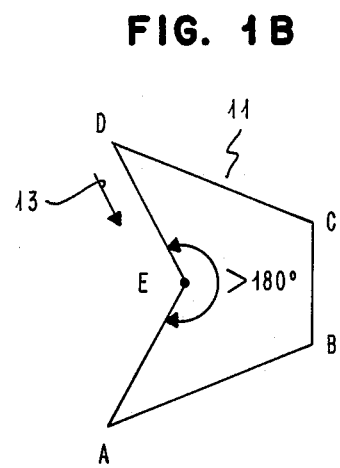
FIG. 1B illustrates a polygon that is not convex as defined by prior art methods.
Figure 2A:
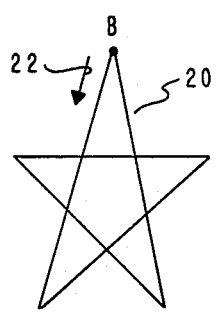
FIG. 2A illustrates a polygon that is convex as defined by prior art methods.
Figure 2B:
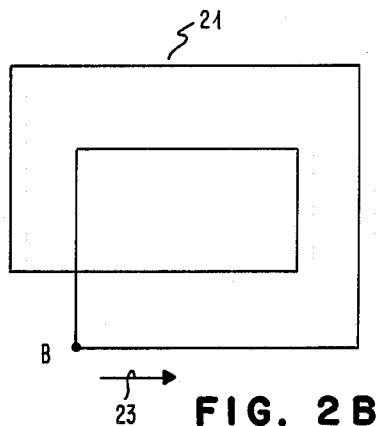
FIG. 2B illustrates a polygon that is convex as defined by prior art methods.
Figure 3A:
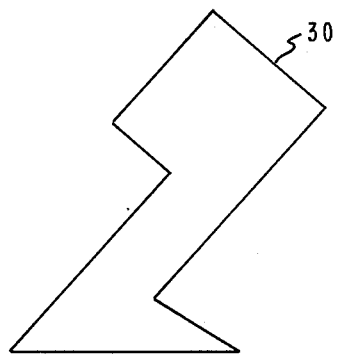
FIG. 3A illustrates a polygon classified as a general polygon for utilizing a general polygon fill algorithm.
Figure 3B:
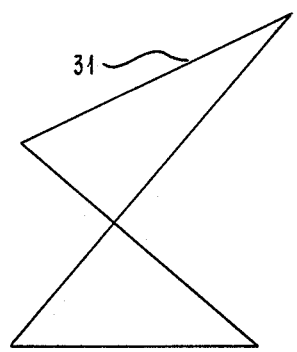
FIG. 3B illustrates a polygon classified as a general polygon for utilizing a general polygon fill algorithm.
Figure 9A:
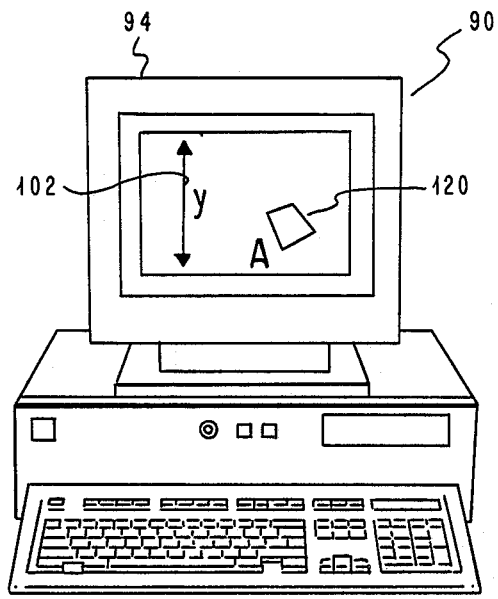
FIG. 9A illustrates the hardware including a display of a processing system for utilizing this invention.
Figures 9B, 9C:
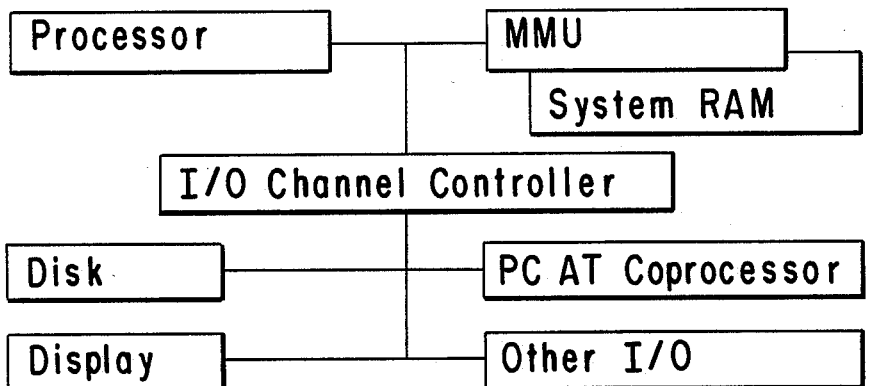
FIG. 9B illustrates the logical structure of the processing system.
FIG. 9C illustrates the physical structure of the processing system.

The present invention comprises two algorithms 60, FIG. 6A, 6B, 6C, 6D, 6E, 6F, 6G and 80 FIG. 8A, 8B, 8C, 8D, 8E, 8F, 8G, 8I for faster polygon filling. These algorithms 60, 80 could be used with displays 94 (FIG. 9A) provided with a processing system 90 such as the IBM RT PC. FIG. 9B shows the logical structure 91 of the processing system 90. FIG. 9C shows the physical structure 92 of the processing system 90. The RT PC is more fully described in *IBM RT Personal Computer Technology*, Form No. SA23-1057, which is herein incorporated by reference. Each algorithm 60, 80 has advantages and disadvantages. Depending on the relative processor, display adapter, memory, and I/O speeds, one or the other algorithms will be more efficient for a particular implementation for a given display.

Both polygon fill algorithms 60, 80 are used to fast fill certain polygons having a specific classification of shape. The first fast polygon fill routine 60 utilizes one table 100 (FIG. 10) for storing values 110 at each y location 101, and the second fast polygon fill routine 80 utilizes two tables 111, 112 (FIG. 11) for storing values 113 at each y location 101 that are needed to fill a polygon.

The size of the table 100 (FIG. 10), 111, 112 (FIG. 11) that is required depends upon the size of the particular display screen 94 (FIG. 9A) that is being used. If the display 94 that is being used is a monochrome display having 375 picture elements (pels) in the y direction 102, the table 100, 111, 112 needs 375 entries 103. If the display 94 (FIG. 9A) is an APA8 display which has 512 pels in the y direction 102, then the table 100, 111, 112 needs 512 entries 103. If the display 94 (FIG. 9a) is a megapel display which has 1024 pels in the y direction 102, the table 100, 111, 112 needs 1024 entries 102. The y entries 101 in the table 100, 111, 112 would range from zero 105 to the size of the screen minus one 107. The table 100, 111, 112 is therefore sized according to the size of the display 94.

The polygon fill algorithms 60, 80 are arranged so that if the actual polygon 120 (FIG. 9A) (not shown to scale) in the y direction ranges from pels having the value of y=10 to y=47, the table 100 (FIG. 10), 111, 112 (FIG. 11) does not have to be initialized for each positioning of the polygon 120. Only the entries 103 in the table 100, 111, 112 having the y values 101 within the polygon range (y=10 to y=47) in the y direction 102 (FIG. 9) are used. If the lowermost vertex A of the polygon 120 begins at the 10th pel in the y direction 102 from the bottom of the screen display 94, the table 100, 111, 112 does not have to be initialized so that the zero entry 105 represents vertex A at the 10th pel position. If the polygon has a total height of 37 pels, only the 11th through 48th entries 103 into the table 100 would be utilized.

The second algorithm 80 utilizes two tables 111, 112 shown in FIG. 11. Each table, 111, 112 has a minimum column 116 and maximum column 118. The tables 111, 112 also have a size that range from zero 105 to the size of the screen minus one 107.

Referring to FIG. 12, as shown on a display 94 (FIG. 9A), the lines 121-124 of polygon 120 are represented by picture elements (pels) such as pels 130 that are turned on throughout scan lines 132 y10-y18 to represent the line 121 of polygon 120. The lines 121-124 of polygon 120 are not actually displayed on the screen 94 (FIG. 9A), but are shown here for description purposes only. Determining which pels 130 are to be turned on for each scan line 132 to best represent each of the lines 121-124 when displayed is accomplished by utilizing the Bresenham algorithm as described in J. E. Bresenham, "Algorithm for Computer Control of a Digital Plotter", *IBM Systems Journal*, Vol. 4, No. 1 (1965), and in J. D. Foley and A. Van Dam, *Fundamentals of Interactive Computer Graphics* (Addison-Wesley), 1982, which are herein incorporated by reference.

In both polygon fill algorithms 60, 80, the points 130 of a polygon 120 (FIG. 12) are generated by using the Bresenham algorithm. The pels 130 selected by the Bresenham algorithm to represent the line 121 are shown in FIG. 12 as filled in zero's. The pels 131 not selected by the Bresenham algorithm to represent a line 121 of the polygon 120 are shown in FIG. 12 as x's. There is a set of scan lines 132 representing each sequential row of pels 130, 131 in the y direction 102. For each line 121, 122, 123, 124 of the polygon 120, points 130 are generated on one scan line 132 at a time to represent collectively a line 121, 122, 123, 124 of the polygon 120.

Figure 13A:
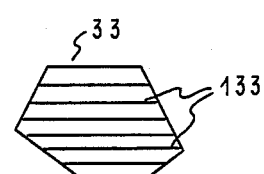
FIG. 13A represents a class of polygons that can be filled by the first polygon fill algorithm and the second polygon fill algorithm.
Figure 13B:
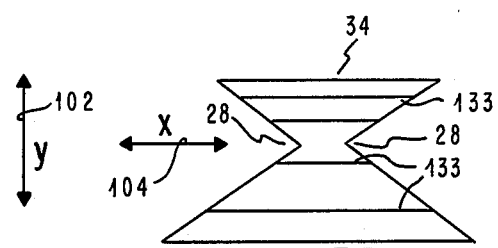
FIG. 13B, 13C represents a class of polygons that can be filled by the second polygon fill algorithm.
Figure 13C:
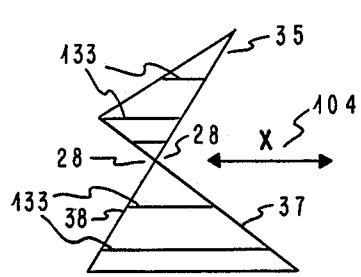
Figure 13D:
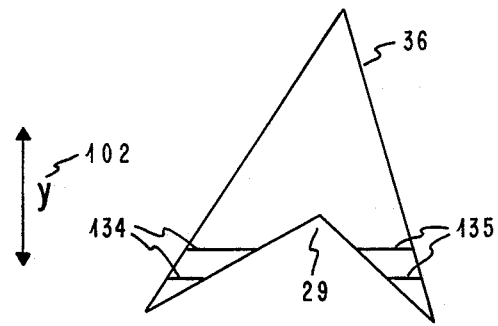
FIG. 13D represents a class of polygons that cannot be filled by either the first or second polygon fill algorithm.

The two polygon fill algorithms 60, 80 each have a different range of a set of polygons 33 (FIG. 13A), 34 (FIG. 13B), 35 (FIG. 13C) that can be filled with the particular algorithm. The second algorithm 80 can fill a larger set of polygons 33, 34, 35 than the first algorithm 60. This set includes the set of all polygons that can be filled such that for each y value 102 there is a unique single line 133 that can be used to fill the polygon 33, 34, 35. This set of polygons 33, 34, 35 can include polygons that are concave 28 in the x direction 104. Additionally, this set includes polygons 35 having crossing lines 37, 38. Polygon 36 (FIG. 13D) illustrates that for each y value 102, there is not a unique single line that can be used to fill the polygon 36. For the lower values of y, there are two lines 134, 135 for each value of y. Therefore, a polygon 36 that is concave 29 in the y direction can not be filled using the second polygon fill algorithm 80. For the first polygon fill routine 60, the set of polygons only includes strictly convex polygons 33. There can not be any concavity in either x or y direction, and no crossing lines.

Therefore, there is a front end 50 (FIG. 5A, 5B, 5C, 5D), 70 (FIG. 7A, 7B, 7C) for each algorithm 60, 80 respectively, that determines whether the polygon fits within the range of polygons for that particular polygon fill algorithm. The following describes the tests that are performed on the polygon to determine in which range of polygons a particular polygon belongs.

The following discussion will center around the polygon 120 in FIG. 12. To begin, a discussion as to the definition of the term direction sensitivity of a polygon is needed. The same polygon 120 can be described by a sequence of x and y coordinates in either a clockwise 25 or counter clockwise 26 order around the polygon 120. The application of any given polygon fill algorithm should have the same result whether the polygon fill algorithm was applied to the polygon in a clockwise 25 or counterclockwise 26 direction. That is, the polygon should result in the same fill regardless of the direction the polygon 120 was traversed in applying the polygon fill algorithm 60, 80. In both of the polygon fill algorithms 60, 80 of this invention, there is no direction sensitivity regardless of the order that the coordinates of the resulting Bresenham pels 130 are presented. In addition, the first test for the first polygon fill algorithm 60 for strictly convex polygons determines the direction, clockwise 25 or counterclockwise 26, that the polygon is traversed in presenting the coordinates of the corresponding pels 130 of the polygon 120. The first polygon fill algorithm 60 is not direction sensitive since the direction is specifically detected as part of the test for this polygon fill algorithm. If the direction is found to be clockwise 25, the order that the points (pels) 130 are scanned is reversed. The points 130 are always scanned counterclockwise 26 around a polygon.

In the second polygon fill algorithm 80, there is no direction sensitivity because there are two tables 111, 112 (FIG. 11) for each side 115, 114 of the polygon 120. Each table 111, 112 has minimum 116 and maximum 118 values in the x direction 104 for each scan line 132 in the y direction 102. Therefore, it does not matter if the polygon 120 is traversed up one side 114 and down the other 115 or vice versa. The result is two tables 111, 112 with minimum 116 and maximum 118 values in each table 111, 112 for each scan line 132 in the y direction 102. For each scan line 132, the maximum value of the two maximum values 118 for the two tables 111, 112 is selected, and the minimum value of the two minimum values 116 for the two tables 111, 112 is selected. A fill line is then drawn from the selected minimum pel to the selected maximum pel.

This is illustrated by referring to FIG. 11 and FIG. 12. For scan line 132 representing the y value 101 of y=13, the maximum value 118 for line 121 of the polygon 120 is pel 46 having a value 118 in this example of x=263. This value would be stored in Table B 112. The minimum value 116 for line 121 of polygon 120 at scan line y=13 is x=262 at pel 45. This value of x=262 would then be stored in Table B 112 of entry y=13. For line 124 of polygon 120, at scan line 132 of y=13 the value of the pel 54 is x=256. Since there is only one pel 130 that is turned on by the Bresenham algorithm for line 124 at this scan line, this value is both the maximum and minimum value of x at y=13. This value of x=256 is stored in Table A at entry y=13. From Table A 111 and Table B 112, the maximum of the maximum values 118 is 263 for y=13, and the minimum of the minimum values 116 is 256 for y=13. A fill line 142 is then drawn from pel 54 to pel 46 by turning on all the pels 130, 131 there between as indicated by the symbol "#" at each pel location.

For the first polygon fill routine 60, there is a determination as to whether the polygon 120 fits into the range of polygons for this particular fill algorithm. There are three parts to this test which are included within the front end 50 (FIG. 5A, 5B, 5C, 5D) of the first polygon fill algorithm 60 (FIG. 6A, 6B, 6C, 6D, 6E, 6F, 6G). The clockwise/counterclockwise test, line 5071 FIG. 5A, the once around test in either the x or y direction, line 5080 FIG. 5A, and the determination of y minimum and y maximum, line 5084 FIG. 5A, for the particular polygon. If the polygon meets these tests, the first polygon fill routine called genline 60 FIG. 6A will be called from the gsff routine 50 at line 5144, FIG. 5C. If the polygon fails any one of these tests, there will be an escape out, line 5106 FIG. 5B, to the general fill algorithm as described in J. D. Foley, A. Van Dam, *Fundamentals of Interactive Computer Graphics*, pages 456–460, which is herein incorporated by reference.

The first test for the first polygon fill algorithm 60 is the clockwise/counterclockwise test, otherwise referred to as the turning test 57 FIG. 5A. This test is described in "Method To Determine the Convexity of Polygons", *IBM Technical Disclosure Bulletin*, Vol. 28, No. 5, October 1985, which is herein incorporated by reference.

More specifically, the preferred embodiment of this invention incorporates this turning test 57 to check for consistent turning direction. That is, going from line to line of a polygon, it is determined whether each new line bends in the same direction. As a fallout of this test, clockwise or counterclockwise is also determined. If two adjacent lines 121, 122 (FIG. 12) has points (x0,y0), (x1,y1), (x2,y2), the calculation for the sign of the vector product is as follows:

$$(y1-y0)*(x2-x1)-(y2-y1)*(x1-x0)$$

If the above expression is greater than zero, then the polygon 120 is turning right for those two lines of the polygon. In this example, the vector product of lines 121 and 122 of polygon 120 would be less than zero indicating that the polygon 120 is turning left or counterclockwise 26. This turning test 57 is repeated for each two adjacent lines of the polygon, line 5089 FIG. 5B. If the results of this test for the same polygon result in the same sign, the polygon meets the consistent turning direction test 57.

The second condition that must be met for the polygon to be strictly convex is the once around y direction test 58, FIG. 5A. This is equivalent to having the sum of the interior angles equal to 360 degrees.

The "once around" test 58 states that if the starting location for traversing the polygon begins at the lowermost vertex 1 (FIG. 12), and the polygon is traversed sequentially along its edges 121, 122, 123, 124, the y coordinates 102 of the sequential edges 121, 122, 123, 124 must first all increase and then decrease. In other words, a first group of edges 121, 122 of the polygon 120 must first all rise, and the second group of edges 123, 124 of the polygon 120 must all then fall.

The once around condition 58 is met if by starting at the first line 121 of the polygon 120 the algebraic sign of y(i+1)−y(i) for all adjacent vertexes changes exactly 2 or 3 times. Horizontal lines are considered to have the same sign as the previous line. Polygons passing this test have y-convexity. That is, for any value of y 102 there is one and only one continuous fill line 142. While traversing around the points 130 of the polygon 120 for the "once around" test 58 (FIG. 5A), the maximum and minimum y values and locations are stored in memory. Before the Bresenham algorithm is used in this polygon fill algorithm, the y maximum 2 and y minimum 1 values are initialized in the table 100 with the x value at those locations. This same x value for y maximum 2 is stored in both the max 107 and min 106 entries in the table 100 for the y maximum entry 103. Likewise, the same x value for y minimum 1 is stored in both the max 107 and min 106 entries in the table 100 for the y minimum entry 103.

The consistent turning direction test 57 along with the once around in the y direction test 58, which is equivalent to stating that the sum of the angles inside the polygon is 360 degrees, state that the polygon 120 has strict convexity. As a result of passing these two tests 57, 58, the sign of the vector product calculated in the consistent turning direction test 57 is then used to determine the direction of the polygon 120. If the value of the above expression is greater than zero, then the polygon 120 was traversed in a clockwise direction 25. If the value of the above expression is less than zero, then the polygon 120 was traversed in a counterclockwise direction 26. Since the first polygon fill algorithm 60 (FIG. 6A, 6B, 6C, 6D, 6E, 6F, 6G) is based on a counterclockwise direction 26, if the sign of the expression indicates a clockwise direction 25, the order that the points 130 are traversed is reversed.

Referring to FIG. 12, once the polygon 120 is determined to have strict convexity as stated above, the lines 121, 122, 123, 124 of the polygon 120 can be partitioned into two sets 114, 115 such that the lines 121, 122 of one set 114 defines maximum values 107 (FIG. 10) of scan lines 132, while the other set 123, 124 defines minimum values 10 (FIG. 10b). Regardless of the presentation of the polygon 120 through the preprocessing of the polygon in the above tests 57, 58, vertex 1 will be determined to be y minimum, and vertex 2 will be determined to be y maximum.

Traversing the polygon 120 from y minimum 1 in a counterclockwise direction 26 to y maximum 2, the maximum value of a scan line 132 is stored in the max entry 107 (FIG. 10) of the table 100 for the appropriate index 103 of y. As the first polygon fill algorithm 50, 60 proceeds from one scan line 132 to the next sequential scan line 132, the maximum value 107 of x at the previous scan line is stored. This is repeated for each scan line 132 of y until y maximum 2 is reached. Once y maximum 2 is reached, the polygon 120 is traversed down from y maximum 2 to y minimum 1 down the lines 123, 124 that were previously partitioned. For this set 115 of partitioned lines 123, 124, the last point 130 on the scan line 132 is stored as the minimum value 106 of x in the table 100 for each y entry 103. This is repeated for each y scan line 132.

For the first polygon fill algorithm 60, the algorithm begins at y minimum (pel 1, FIG. 12) and proceeds in a counterclockwise direction 26 to y maximum shown as pel 2. During this traverse from y minimum 1 to y maximum 2, table 100 having min and max entries 110 for each y 102 is used. The maximum x value (which is the last point (pel) 130 on a scan line 132) for each y 102 is stored in the table 100. Once y maximum 2 is reached in the traverse, the polygon is traversed from y maximum 2 to y minimum 1. During this part of the polygon traverse, the minimum value for a pel 130 on each scan line 132 is stored in the table. In other words, it is the last point 130 that is scanned on the previous scan line after proceeding to the next y scan line. Going from the lowermost vertex 1 to the higher most vertex 2 of the polygon 120 in counter clockwise direction 26, the maximum value is stored in the array. Going from the higher most vertex 2 to the lower most vertex 1 in counter clockwise direction 26, the minimum value is stored in the array.

For example, traversing the polygon 120 counterclockwise 26 starting with line 121, the x value at pel 42 would be stored at the max entry 107 for the y entry 103 at y=11 representing scan line 132 for y=11. For the next scan line 132 of y=12. the value of pel 44 would be stored at the maximum entry 107 for the y entry 103 of y=12. This is repeated for each scan line 132. Likewise, traversing the polygon 120 down from vertex 2, the minimum value for a pel 130 at a scan line 132 would be stored in the minimum entry 106 for the corresponding y entry 103. For example, the value of pels 54, 53, 51 would be stored at the minimum entry 106 for scan lines 132 representing y=13, y=12, and y=11 respectively in table 100.

As seen in FIG. 5A, 5B, 5C, 5D which lists the code in C language for the first polygon fill algorithm 50 called gsff, the first argument, inlines, 151 is the number of lines 121-124 in the polygon 120. The second argument, inx, 152 is the array of x points in the polygon 120. The third argument, iny, 153 is the array of y points in the polygon 120. These first three parameters 151, 152, 153 are the input parameters. The xs argument 154 is a pointer to the beginning of the array 100 which contains both min 106 and max 107 values in an alternating fashion as shown in FIG. 10. The first entry is x min 106 at y=0, the second entry is x max 107 at y=0, the third entry is x min 106 at y=1, the fourth entry is x max 107 at y=1, and so forth. This continues for the size of the screen minus 1, such as 1023 for a screen having 1024 pels in the y direction 102. The ys argument 155 is just an implementation detail such that it is simply an array of points 0,0,1,1,2,2,3,3, etc. to the size of the screen minus one, i.e., 1023, 1023. The ys array 101 is initialized once, line 5052. When this array 101 is called, it is called with an x 110 and y 101 pair to get the right y with the x.

Lines 5057 to 5087 initializes the once around y test and the turning test. Lines 5095-5097 is the expression used for the turning test. Lines 5084 to 5087 initialize y min and y max at the first point. Next, there is a for loop, line 5089, which performs the three tests as previously discussed. The for loop keeps calculating the turning test lines 5090-5097, it updates y min and y max, lines 5109-5111, and it updates the once around test, lines 5099-5102. In the once around test 58, line 5099-5102, the new sign is equal to 0 if it is negative, and 1 if it is positive. One is added to the count if the new sign is not equal to the old sign. This counts the number of changes in the sign. If the direction outside of the loop is different from the direction that was just calculated, or if the count of the number of changes in the sign of y is four or greater, line 5104, the test fails, line 5105, and the loop is exited, line 5106. If the test does not fail, the algorithm continues as follows.

The next step, line 5109, is the y high test. If the new y is higher than the previous y max, the y max is updated to the new value. The index where the new y max was found is stored. The same is done with the minimum. If the maximum was not exceeded, the y min value is checked to see if the new y value is less than the previous y min value. If it is, the y min value is updated with the new y min value. The index is also updated to note the location of the y min value. This ends the loop at line 5112. Lines 5089 to 5112 are the pretest. The gsff algorithm 50 continues at line 5114 if the fail flag was not set during the pretest.

Line 5114 shows that the total number of points for the y array 101 (FIG. 10) is two times the sum of y max minus y min plus one. Lines 5116 to 5118 is a conditional print out for debugging purposes. Lines 5119-5134 is diagnostic output. If the fail flag equals one, the pretest failed. If the directions are different, the algorithm prints out that the convexity test failed. If the change in sign is more than or equal to four, the algorithm prints out that the around test failed.

This is the point, at line 5125, in the application code that a more general algorithm would be called to fill the polygon if the pretest failed. If the pretest fails, the first polygon fill routine cannot be used for the type of polygon that is selected by the user to be filled.

Line 5140 states that if the direction is zero, then it is already counterclockwise, and the points 130 are scanned from the low point in a counter clockwise direction for each line 121-124, in the polygon. Lines 5140 to 5153 show how the lines in the polygon are scanned if the low point is not the first line of the polygon.

Line 5144 is the actual call, genline 60, to the heart of the first polygon fill algorithm. The steps prior to line 5144 insured that the right line was pointed to and that it was counter clockwise, etc.

Genline 60, line 5144 (FIG. 5C), has five arguments. The first argument 154 is an address to the min/max array 100 (FIG. 10) in which values of xmin 106 and xmax 107 for each y value 103 are stored. The next two arguments 152, 153 are the x and y of the jth point in the scan, the next two arguments 156, 157 are the x and y of the point immediately after the jth point. Therefore, genline 60 is called with a pointer into the array 100, and a line described by an x and y for a first pel and the next adjacent x and y for the second pel.

Figure 14:
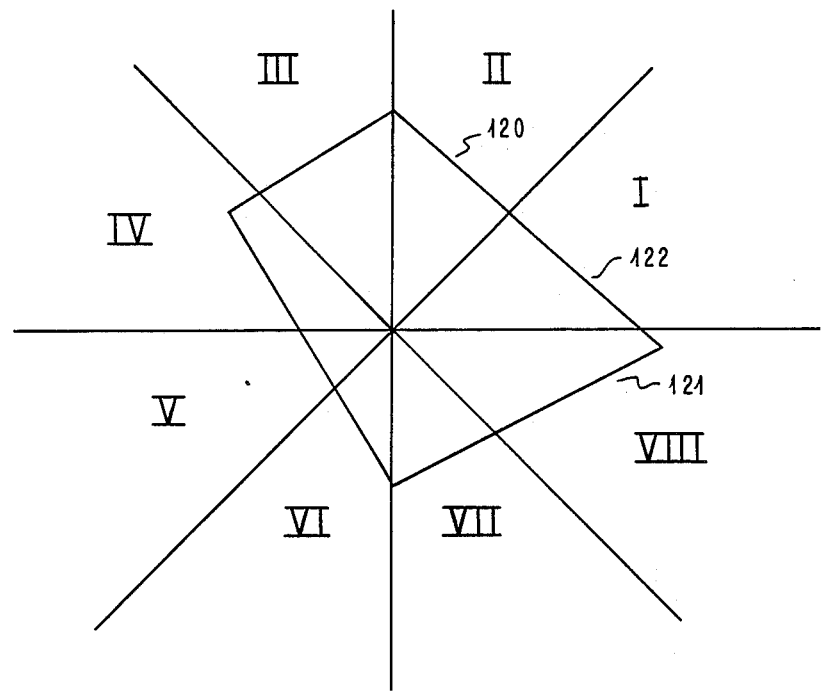
FIG. 14 illustrates the arrangement of a polygon in octants.

Genline 60 computes the minimum 106 and maximum 107 values for each y value of a scan line 132. It is assumed that the polygon 120 is strictly convex and the polygon 120 is presented in a counterclockwise 26 order. Therefore, the polygon 120 can be filled with a single horizontal line 142 for each value of y 102. Only one table 100 is used, and only one minimum 106 and maximum 107 value is saved in this table 100 for each scan line 132. A line with multiple pels 130 at the same y 102 is handled by only updating x when y changes. For lines in octants I, II, VII, VIII the update will be maximum 107, while for octants III, IV, V, VI the update will be minimum 106. As shown in FIG. 14, the octant I begins at 0 degrees where y is zero and x is any positive value and terminates at 45 degrees. Octant II ranges from 45 degrees to 90 degrees. This continues in likewise fashion for octants I-VIII. A line of a polygon is in octant I if the line's angle is between zero and 45 degrees. A line of a polygon is in octant II if the angle of the line is between 45 degrees and 90 degrees. A line of a polygon is in one of the eight octants depending on the angle of the line. The polygon 120 is organized within these octants such that as the polygon is traversed up the front face 121, 122, the points can only lie in octants VII, VIII, I, II.

The table 100 (FIG. 10) is unique to this procedure, but could be used for other implementations. The key is that since there is only one x minimum 106 and one x maximum 107 for each y 103, all y's are constant and are computed only once at initialization. The table is organized as illustrated in FIG. 10 as follows:

y0 xmin
y0 xmax
y1 xmin
y1 xmax
y2 xmin
y2 xmax . . . .
ymax xmin
ymax xmax

The xmin is initialized for the ymax, and the xmax is initialized for the ymax. This eliminates having to save the x value, minimum or maximum, at the first point of a line. The first point 141, 161 (FIG. 12) is excluded when drawing a line, but every point 130 after that is included. Only the portion of the table 100 from ymin 1 to ymax 2 of the given polygon 120 is used for filling the polygon.

Therefore, genline 60 generates the points 130 for one line 121-124 of the polygon 120. Line 6049 and line 6050 generates the slope of the line. Line 6055 calculates the address of the present location in the array. This points to the minimum of x 106 in the table 100 at the present location. For example, if y were 10, the pointer would point to the 20th location 108 in the array 100. This entry 108 would contain the minimum x value 106 for y10, and the next entry 109 would contain the maximum value 107 of x for y10.

Line 6060 of the genline algorithm 60 covers the special case where the line of the polygon 120 is horizontal. If the first y is equal to the second y, then there is a horizontal line. If on the horizontal line, x2 is greater than x1, all the points are on the same scan line, and the implementation of the Bresenham algorithm is not needed. In this case the greatest value of x, x2, is stored as x max. If x2 is less than x1, the line lies in either octant III, IV, V, VI and the smallest value of x, x1, is stored as x min 106.

Lines 6070 to 6121 determine which octant the line 121-124 lies in. The logic branches out depending on whether x1 or x2 is greater, whether y1 or y2 is greater, and the relative signs of the slopes. Depending on these three variables, there are eight different cases. The octant that the line will be drawn in is then set up, along with the Bresenham constants "a" and "b".

Figure 15:
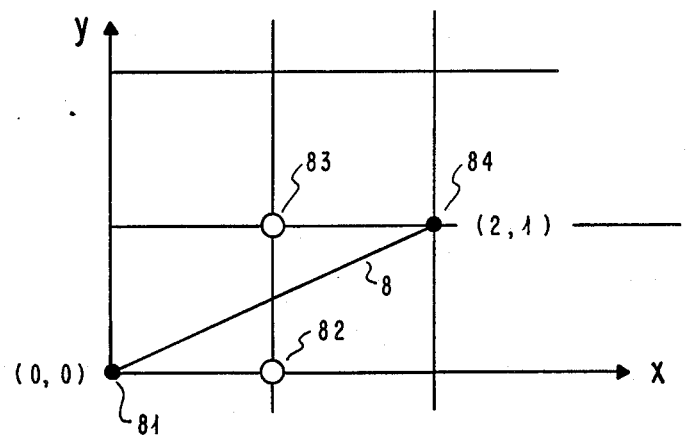
FIG. 15 illustrates the rounding error when the direction of traverse is reversed.

Lines 6124, 6125, 6126 take the results of the "a" and "b" constants and generate three more Bresenham constants called b minus a (bma) 170. The bma constant 170 is equal to two times b minus a. The b2 constant 171 is equal to two times b. The i constant 172 is the error constant which is equal to 2 times b minus a minus x2 less than x1. The term x2 less than x1 forces the rounding to be correct so that the same points are selected regardless of the direction the polygon is traversed. An example of this is shown in FIG. 15.

Typically, if a Bresenham line is drawn by traversing points in one direction, the same Bresenham line will not result if the points are traversed in the opposite direction. A simple way to show this is a line 8 that has a slope equal to one half as shown in FIG. 15. If the line starts at (0,0), pel 81 and ends at (2,1), pel 84, the ideal line 80 lies directly between pels 82 and 83. The Bresenham algorithm is defined such that there is a rounding up. Therefore, pel 83 would be turned on instead of pel 82 if the line were in the first octant. The Bresenham line would therefore consist of pels 81, 83, 84. If this same line were drawn as if it resided in octant five, the starting point would be at 2,1 and the line would be traversed to 0,0. Going in the opposite direction, the rounding up would cause pel 82 to be selected. In order to insure that the same line drawn in either direction comprises the same points, the rounding is always forced the same regardless of direction.

The rest of the genline algorithm 60, starting with line 6128, covers eight different cases depending upon which octant the line 121-124 lies in. For example, for octant one, the line is going up as was previously defined for octants I, II, VII, VIII. Therefore, the algorithm 60 is looking to store the maximum value of x for each y. The first point 141, (FIG. 12) is excluded in the loop. The loop begins with x equal to x1 plus 1. This loop is performed for x less than or equal to x2. If the error coefficient is less than zero, this means that the value wasn't great enough to move to the next scan line. The constant b2 is added to i and the loop is done again. If i is equal or greater than zero, this means that the half way point is exceeded and the next scan line is accessed. In that case, the previous value (x minus 1) 42, 44, 46, etc. on the previous scan line is saved in the table as x max 107 for the previous value of y. Therefore, the code between 6129 and 6139 has stored the last maximum value 42, 44, 46 of each scan line 132. There are also some special cases when the end of a scan line 132 is reached and no values have been stored yet. In this case, the last x value (as represented by x minus one since the for loop has already incremented x) for that scan line is stored.

All of the other cases also store the last pel from the previous scan line. For each line 121-124 of the polygon 120, the genline algorithm 60 is called. The part of the algorithm 60 that is implemented is dependent upon which octant the line resides.

The algorithm 60 only stores one pel location 130 for each scan line 132 for each line 121-24 of the polygon 120. This minimizes the number of store operations that have to be performed. Since the polygon is strictly convex, there will be exactly one minimum 106 and maximum 107 value stored for each scan line 132.

The general program ffpfl 40 (FIG. 4A, 4B, 4C, 4D, 4E, 4F, 4G, 4H) is the main driver program. In case five of this program, line 4136, there is a call to the first polygon fill routine, gsff 50 (FIG. 5A, 5B, 5C, 5D). The program gsff 50 (FIG. 5A, 5B, 5C, 5D) then calls genline 60 (FIG. 6A, 6B, 6C, 6D, 6E, 6F, 6G). Under case 6 of the program ffpfl 40, there is a call to the second polygon fill algorithm, gsff2 70 (FIG. 7A, 7B, 7C, 7D). If the conditions of the second polygon fill algorithm, gsff2 70, are met, gsff2 70 calls a second genline program, genline2 80 (FIG. 8A, 8B, 8C, 8D, 8E, 8F, 8G, 8H, 8I) at line 7099 of gsff2 70 FIG. 7B, 7C.

The second polygon fill routine, gsff2 70, also checks to see if the particular polygon is within the range of polygons applicable for the second polygon fill algorithm. This test is simpler than the test for the first polygon fill algorithm 60 since the test for the second polygon fill algorithm 80 only contains the once around in the y direction test, lines 7056-7070, FIG. 7A, 7B. As long as the y values 102 of a particular polygon only increase, and then decrease, the polygon can be filled by this second polygon fill algorithm 80.

Starting anywhere on the closed polygon, the algebraic sign of y2-y1 is check to see whether it changes either 2 or 3 times. This gives the condition of "y-convexity". That is, for any value of y 102, there is one and only one continuous fill line 133, FIG. 13A, 13B, 13C. . Horizontal lines are considered to have the same sign as the previous line. Also, the maximum and minimum y values are recorded at the same time, lines 7060-7063, FIG. 7B. If the polygon fails the test, lines 7069-7070, FIG. 7B, the standard GSL polygon fill algorithm is used instead of the second polygon fill routine, genline2, 80 (FIG. 8A, 8I).

Figure 16A:
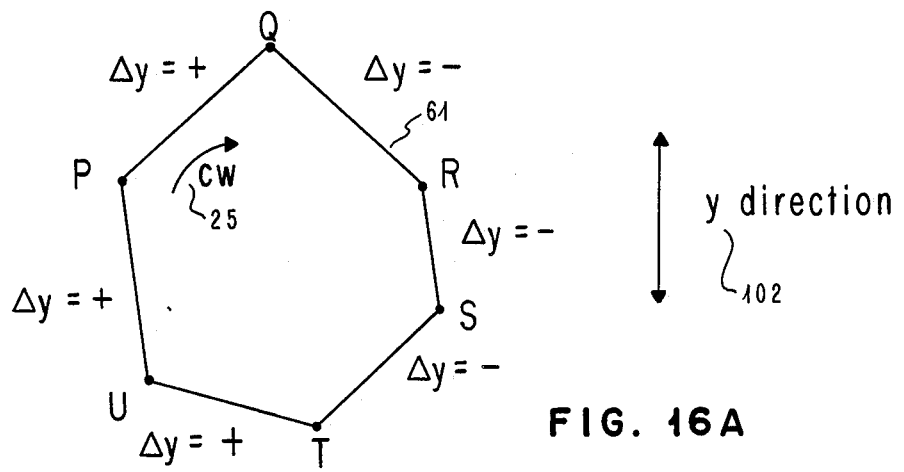
FIG. 16A illustrates a class of polygons that meet the once around test, and can be filled by the second polygon fill algorithm.

Referring to FIG. 16A for this once around test, and starting with vertex P and proceeding in the clockwise direction 25, the change in the delta y sign is recorded. Proceeding from vertex P to vertex Q, delta y is positive. Proceeding from vertex Q to vertex R, delta y is negative. Proceeding from vertex R to vertex S, delta y is negative. Proceeding from vertex S to vertex T, delta y is negative. Proceeding from vertex T to vertex U, delta y is positive. Proceeding from vertex U to vertex P, delta y is positive. Analyzing the changes in the change, delta y changed signs three times. If a polygon meets the once around test, the number of different sign changes will be exactly either two or three times. Taking this same polygon 61 as in FIG. 16A, if the polygon 61 were traversed beginning at vertex T in a clockwise direction 25, the count of the sign changes would be two. From vertex T to vertex Q, all delta y's are positive, and from vertex Q to vertex T in the clockwise direction 25, all delta y's are negative.

Figure 16B:
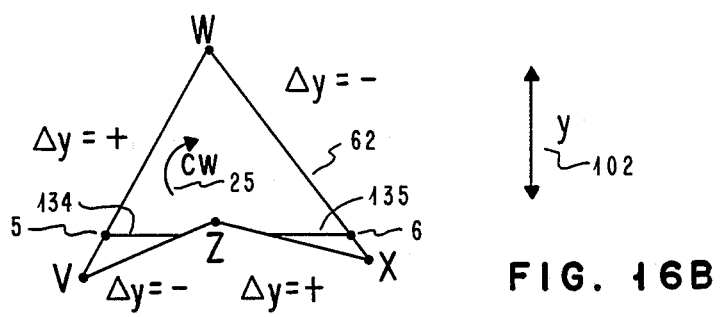
FIG. 16B illustrates a class of polygons that fail the once around test, and cannot be filled by the second polygon fill algorithm.

If the count of each group of delta y change in sign is greater than three, then the polygon fails the once around test as shown in FIG. 16B. The polygon 62 shown in FIG. 16B shows four different changes in signs of delta y as the polygon 62 is traversed clockwise starting with vertex V. The polygon 62 shown in FIG. 16B illustrates a polygon that could not be filled with this second polygon fill algorithm 80. This polygon 62 could not be filled with just one scan line 134, 135 as illustrated between point 5 and point 6. Although both point 5 and point 6 have the same y value 102, two different lines 134, 135 are needed to fill the polygon 62.

The second polygon fill algorithm 80 could be modified to fill polygons having the characteristics of the polygon 62 in FIG. 16B, but the algorithm would become more complex. For example, the algorithm could be expanded by having two sets of minimum and maximums, and initializing these values. However, the algorithm becomes more complex and the generality of the algorithm is lost.

Figure 16C:
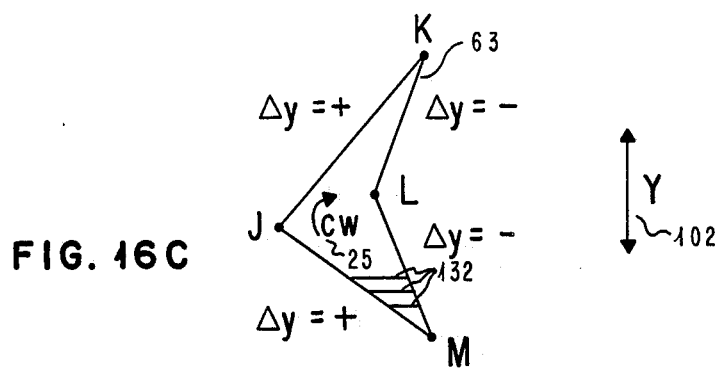
FIG. 16C illustrates a class of polygons that are not strictly convex, are concave in the x direction, and meet the once around test, and can be filled by the second polygon fill algorithm.

The polygon 63 shown in FIG. 16C is not strictly convex, but this polygon 63 still fits in with the second polygon fill algorithm 80. This polygon 63 is concave in the x direction. However, this polygon 63 meets this once around test. By traversing the polygon 63 clockwise 25 starting with vertex J, the delta y is positive from vertex J to vertex K. The delta y sign is negative from vertex K to vertex L and vertex L to vertex M. The delta y sign is then positive from vertex M to vertex J. No matter what the starting position, there will either be two or three changes in the sign of delta y. This polygon can be filled by a unique y scan line 132 for each y value 102.

If the polygon fails the once around test, the standard GSL polygon fill algorithm is used instead of the second polygon fill algorithm 80. If the once around condition is met, gsff2 70 FIG. 7A calls the second polygon fill algorithm, genline2, 80 FIG. 8A, 8B, 8C, 8D, 8E, 8F, 8G, 8H, 8I, at line 7099 FIG. 7C.

Genline2 80 is similar to genline1 60. However, instead of storing the last point on the scan line 132, it stores the first and last points on a scan line 132. In lines 8062, 8063 genline2 80 computes the slope as in genline1 60. Between lines 8072 and line 8121 there is the same octant logic as in genline1 60. Lines 8126-8128 have the same initialization of the Bresenham algorithm. From line 8139 there is the same for loop from x equal x plus one to x less than or equal to x2. The only difference is that now both minimum and maximum values are selected. If i is less than zero in line 8140, this means that nothing is changing. When i equal i plus b minus a, at table plus one, the previous maximum value of x is stored. Immediately, the table is moved up one and the present value of x which is on the new scan line is also stored. For any scan line, the fill line is drawn from the least minimum value to the greatest maximum value of the values which are stored in the two arrays.

Referring to FIG. 12, the second polygon fill algorithm, genline2, 80 begins at the point where y has the minimum value 1. For each line 121-124, the minimum and maximum value on each scan line 132 is saved in two tables 111, 112 FIG. 11. Each table 111, 112 has two entries 116, 118 for each y value 103. For lines 121, 122 between ymin 1 and ymax 2, in a counter clockwise direction 26, entries are made in a second table 112. For lines 123, 124 between ymax 2 and ymin 1, in a counter clockwise direction 26, entries are made in a first table 111.

Traversing up the polygon 120, table B 112 is used, and traversing down the polygon 120, table A 111 is used. There are more stores and processing in this routine 80 than the first polygon fill algorithm 60. This makes the second polygon fill routine 80 slower than the first polygon fill routine 60. However, the advantage is that it can fill a larger class of polygons FIG. IA, IB, 3A, 3B, 13A, 13B, 13C, 16A, 16C. Nevertheless, the second polygon fill routine 80 is still faster i.e, it takes less processing time, than the general polygon fill algorithm.

After filling the tables 111, 112 a multiline draw routine is called, lines 7111-7112 FIG. 7D to draw one horizontal line 142 per y 102 in the range ymin 1 to y max 2. This routine 70 combines the two tables 111, 112 into one table, line 7104 FIG. 7C, before calling the GSL multiline routine. The combining consists of finding the minimum of two minimums and the maximum of two maximums for each scan line 132. Alternatively, a multiline routine could be written that takes a pointer to both tables 111, 112 and creates the min and max for each scan line as it proceeds.

Traversing up the polygon 120, both values of the first pel 41, 43, 45 and last pels 42, 44, 46 on each scan line 132 respectively are stored. When this is completed the B array 112 is filled with both minimum and maximum values of x for each scan line 132. Traversing down the polygon 120, the minimum and maximum values of x for each scan line 132 are stored in the A array 111. Because of the convexity requirement, there is exactly one line on the way up, and one line on the way down. As a final post process, either pointers to both arrays are sent off to the display, or a post processor determines the least minimum value and the greatest maximum value for each scan line which is then sent off to the display.

While the invention has been particularly shown and described with reference to a preferred embodiment, it will be understood by those skilled in the art that various changes in form and detail may be made without departing from the spirit and scope of the invention. For example, although the invention has been described with reference to an x and y direction, it is within the spirit and scope of this invention that the directions could be interchanged. As such, this invention would accommodate any display that operated by having scan lines in the y direction instead of the x direction.

We claim:

1. A method in a graphics display system for filling a polygon having a boundary of a plurality of lines definable by a plurality of selectable pels, said method comprising:
   testing the polygon for strict convexity;
   traversing sequentially the boundary along each one of said plurality of lines one at a time;
   storing, during said sequential traverse for a given line of said traverse, a minimum value of at least one of said plurality of selectable pels for each one of a plurality of scan lines if said minimum value is less than a different value for any different one of said selectable pels of said boundary of said polygon at said scan line;
   storing, during said sequential traverse for a given line of said traverse, a maximum value of at least one of said plurality of selectable pels for each one of a plurality of scan lines if said maximum value is greater than a different value for any different one of said selectable pels of said boundary of said polygon at said scan line; and
   drawing a fill line, after said sequential traverse, between said selectable pel having said minimum value and said selectable pel having said maximum value for each one of said plurality of scan lines.

2. The method of claim 1 wherein said strict convexity test further comprises the steps of testing for consistent turning direction, and determining if a sum of all of a plurality of interior angles of said polygon is equal to 360 degrees.

3. The method of claim 2 wherein said determining the sum step further comprises determining if the number of sign changes for delta y for each sequential line of the polygon is two.

4. The method of claim 2 wherein said determining the sum step further comprises determining if the number of sign changes for delta y for each sequential line of the polygon is three.

5. The method of claim 2 wherein said determining the sum step further comprises determining if a plurality of y values of said polygon increase in value, and then decrease in value.

6. The method of claim 2 wherein said determining the sum step further comprises determining if a plurality of y values of said polygon increase in value, and then decrease in value, and then increase in value.

7. The method of claim 2 wherein said determining the sum step further comprises determining if a plurality of y values of said polygon decrease in value, and then increase in value.

8. The method of claim 2 wherein said determining the sum step further comprises determining if a plurality of y values of said polygon decrease in value, and then increase in value, and then decrease in value.

9. A method in a graphics display system for filling a polygon having a boundary definable by selectable pels, said method comprising: traversing sequentially the boundary along said selectable pels;
   storing in an array, during said sequential traverse, a maximum value of said selectable pel for each one of a plurality of scan lines of said polygon during said traverse from a y minimum value of said polygon to a y maximum value of said polygon;
   storing in said array, during said sequential traverse, a minimum value of said selectable pel for each one of said plurality of scan lines of said polygon during said traverse from said y maximum value of said polygon to said y minimum value of said polygon; and
   drawing a fill line, after said sequential traverse, from said selectable pel of minimum value to said selectable pel of maximum value for each one of said plurality of scan lines.

10. A method for selecting a plurality of outer pels along a boundary of a polygon having a plurality of lines definable by a plurality of selectable pels, each one of said plurality of lines being in one of eight octants, said method comprising:
   determining the octant of each one of said plurality of lines of said polygon;
   traversing sequentially the lines of the polygon; and
   stepping repetitively from a previous scan line to a next scan line during said sequential traverse.

11. A method for selecting a plurality of outer pels along a boundary of a polygon having a plurality of lines definable by a plurality of selectable pels, each one of said plurality of lines being in one of eight octants, said method comprising:
   determining the octant of each one of said plurality of lines of said polygon;
   traversing sequentially the lines of the polygon;
   stepping repetitively from a previous scan line to a next scan line during said sequential traverse; and
   storing a value of a last selectable pel on the previous scan line after said step from said previous scan line to said next scan line if said one of said plurality of lines is determined to be in a first octant.

12. A method for selecting a plurality of outer pels along a boundary of a polygon having a plurality of lines definable by a plurality of selectable pels, each one of said plurality of lines being in one of eight octants, said method comprising:
   determining the octant of each one of said plurality of lines of said polygon;
   traversing sequentially the lines of the polygon;
   stepping repetitively from a previous scan line to a next scan line during said sequential traverse; and
   storing a value of a last selectable pel on the next scan line if the next scan line is a last scan line of said line of said polygon and if said one of said plurality of lines is determined to be in a first octant.

13. A method for selecting a plurality of outer pels along a boundary of a polygon having a plurality of lines definable by a plurality of selectable pels, each one of said plurality of lines being in one of eight octants, said method comprising:
   determining the octant of each one of said plurality of lines of said polygon;
   traversing sequentially the lines of the polygon;
   stepping repetitively from a previous scan line to a next scan line during said sequential traverse; and
   storing a value of a last selectable pel on the previous scan line after said step from said previous scan line to said next scan line, if said one of said plurality of lines is determined to be in a fifth octant.

14. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon; stepping repetitively from a previous scan line to a next scan line during said sequential traverse; and
- storing a value of a last selectable pel on the next scan line if the next scan line is a last scan line of said line of said polygon, and if said one of said plurality of lines is determined to be in a fifth octant.

15. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan line to a next scan line during said sequential traverse; and
- storing a value of the selectable pel on said next scan line if said one of said plurality of lines is determined to be in a second octant.

16. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan line to a next scan line during said sequential traverse; and
- storing a value of the selectable pel on said next scan line if said one of said plurality of lines is in a third octant.

17. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan line to a next scan line during said sequential traverse; and
- storing a value of the selectable pel on said next scan line if said one of said plurality of lines is in a sixth octant.

18. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan line to a next scan line during said sequential traverse; and
- storing a value of the selectable pel on said next scan line if said one of said plurality of lines in in a seventh octant.

19. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan lines to a next scan line during said sequential traverse; and
- storing a value of a first selectable pel on the next scan line after said step from said previous scan line to said next scan line if said one of said plurality of lines is in a fourth octant.

20. A method for selecting a plurality of outer pels along a boundary of a polygon having a plurality of lines definable by a plurality of selectable pels, each one of said plurality of lines being in one of eight octants, said method comprising:
- determining the octant of each one of said plurality of lines of said polygon;
- traversing sequentially the lines of the polygon;
- stepping repetitively from a previous scan line to a next scan line during said sequential traverse; and
- storing a value of a first selectable pel on the next scan line after said step from said previous scan line to said next scan line if said one of said plurality of lines is in an eighth octant.

21. A system having a graphics display for filling a polygon having a boundary definable by a plurality of selectable pels, said system comprising:
- means for traversing sequentially the boundary along said plurality of selectable pels;
- means for storing in a memory array during said traverse a value of an outer pel of said boundary of said plurality of selectable pels for each one of a plurality of scan lines of said polygon; and
- means for drawing a fill line, after said traverse, between said outer pels having said stored values, for each scan line.

22. The system of claim 21 further comprising means for testing the polygon for strict convexity.

23. A method for filling a polygon having a plurality of lines definable by a plurality of selectable pels in a graphics display system comprising:
- testing the polygon for one continuous scan line for each one of a plurality of scan lines within said polygon;
- traversing sequentially the lines of the polygon;
- storing a minimum and a maximum value of said selectable pels for each one of said plurality of scan lines for each one of said plurality of lines during said traverse; and drawing a fill line, after said traverse, from a least value of said minimum value to a greatest value of said maximum value for each one of said plurality of scan lines.

24. The method of claim 23 wherein said polygon has x concavity.

25. The method of claim 23 wherein said polygon has crossing lines.

26. A method for filling a polygon having a plurality of lines definable by a plurality of selectable pels in a graphics display system comprising:
- determining if a sum of all of a plurality of interior angles of said polygon is equal to 360 degrees;
- traversing sequentially the lines of the polygon;
- storing, during said traverse, a value of an outer pel of said selectable pels for each one of said plurality of scan lines for each one of said plurality of lines during said traverse; and drawing a fill line, after said traverse, from said outer pel having a least value to said outer pel having a greatest value for each one of said plurality of scan lines.

27. A method for filling a polygon having a plurality of lines definable by a plurality of selectable pels in a graphics display system comprising:

traversing firstly the polygon in a same direction along the selectable pels of the polygon from a lowest point of the polygon to a highest point of the polygon;

storing in a second table a minimum and a maximum value of said selectable pels for each one of a plurality of scan lines during said first traverse;

traversing secondly the polygon in the same direction along the selectable pels of the polygon from the highest point of the polygon to the lowest point of the polygon;

storing in a first table the minimum and the maximum value of said selectable pels for each one of a plurality of scan lines of the polygon during said second traverse; and drawing a fill line from a least minimum value from the first and second table to a greatest maximum value from the first and second table for each one of a plurality of scan lines of the polygon.

28. A system having a graphics display for displaying polygons having a plurality of lines definable by a plurality of selectable pels, said system comprising:

means for a first polygon traverse along the selectable pels of the lines of the polygon from a lowest point of the polygon to a highest point of the polygon;

a second array for storing from said first traverse a minimum and a maximum value of said selectable pels for each one of a plurality of scan lines of said polygon;

means for a second polygon traverse along the selectable pels of the lines of the polygon from the highest point of the polygon to the lowest point of the polygon;

a first array for storing from said second traverse the minimum and the maximum value of said selectable pels for each one of said plurality of scan lines of said polygon; and means for drawing a fill line from a least minimum value of said first and second array to a greatest maximum value of said first and second array for each one of said plurality of scan lines.

* * * * *